(12) United States Patent
Lee et al.

(10) Patent No.: US 12,361,226 B2
(45) Date of Patent: Jul. 15, 2025

(54) TRAINING FRAMEWORK FOR AUTOMATED TASKS INVOLVING MULTIPLE MACHINE LEARNING MODELS

(71) Applicant: Microsoft Technology Licensing, LLC, Redmond, WA (US)

(72) Inventors: Charles Yin-Che Lee, Mercer Island, WA (US); Ruijie Zhou, Lexington, MA (US); Neha Nishikant, Kendal Park, NJ (US); Soham Shailesh Deshmukh, Redmond, WA (US); Jeremiah D. Greer, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 413 days.

(21) Appl. No.: 17/516,940

(22) Filed: Nov. 2, 2021

(65) Prior Publication Data

US 2023/0135962 A1 May 4, 2023

(51) Int. Cl.
*G06F 17/00* (2019.01)
*G06F 16/332* (2019.01)
(Continued)

(52) U.S. Cl.
CPC .......... *G06F 40/40* (2020.01); *G06F 16/3326* (2019.01); *G06F 40/284* (2020.01);
(Continued)

(58) Field of Classification Search
CPC ........ G06F 40/20; G06F 40/284; G06F 40/40; G06F 40/35; G06F 40/30; G06F 8/436;
(Continued)

(56) References Cited

U.S. PATENT DOCUMENTS 10,572,602 B2 * 2/2020 Sarikaya ................. G06F 40/40
2017/0293851 A1 10/2017 Chawla et al.
(Continued)

FOREIGN PATENT DOCUMENTS

CN 112639827 A 4/2021
WO 2021165430 A1 8/2021

OTHER PUBLICATIONS

"Ensemble Methods: Combining Multiple Models to Improve the Desired Results", Retrieved from: https://web.archive.org/web/20200922053307/https://corporatefinanceinstitute.com/resources/knowledge/other/ensemble-methods/, Sep. 22, 2020, 7 Pages.
(Continued)

*Primary Examiner* — Michael Ortiz-Sanchez

(57) ABSTRACT

In non-limiting examples of the present disclosure, systems, methods and devices for training machine learning models are presented. An automated task framework comprising a plurality of machine learning models for executing a task may be maintained. A natural language input may be processed by two or more of the machine learning models. An action corresponding to a task intent identified from the natural language input may be executed. User feedback related to the execution may be received. The feedback may be processed by a user sentiment engine. A determination may be made by the user sentiment engine that a machine learning model generated an incorrect output. The machine learning model that generated the incorrect output may be identified. The machine learning model that generated the incorrect output may be automatically penalized via training. Any machine learning models that a user expressed neutral or positive sentiment toward may be rewarded.

20 Claims, 10 Drawing Sheets

(51) Int. Cl.
*G06F 40/284* (2020.01)
*G06F 40/40* (2020.01)
*G06N 3/045* (2023.01)
*G06F 16/334* (2025.01)

(52) U.S. Cl.
CPC ......... *G06N 3/045* (2023.01); *G06F 16/3344* (2019.01); *G06F 16/3346* (2019.01)

(58) Field of Classification Search
CPC .. G06F 16/3329; G06F 16/33; G06F 16/3322; G06F 16/3325; G06F 16/3326; G06F 16/334; G06F 16/3344; G06F 16/3346; G06F 16/338; G06F 16/35; G06F 40/216; G06F 16/00; G06F 16/3331; G06F 40/00; G06F 2209/5017; G06F 16/90332; G06F 30/27; G06F 16/248; G06F 16/9038; G06F 8/65; G06N 3/02; G06N 3/045; G06N 3/042; G06N 3/0455; G06N 3/084; G06N 3/08; G06N 20/00; G06N 3/044; G06N 3/0464; G06N 3/09; G10L 15/1815; G10L 15/183; G10L 15/1822; G10L 2015/225; G10L 2015/221; G10L 2015/223; G10L 15/18; G10L 15/16; G10L 15/14; G10L 15/22
See application file for complete search history.

(56) References Cited

U.S. PATENT DOCUMENTS

| | | | |
|---|---|---|---|
| 2018/0018562 A1* | 1/2018 | Jung | G06N 3/006 |
| 2019/0324553 A1* | 10/2019 | Liu | G10L 17/06 |
| 2020/0175478 A1 | 6/2020 | Lee et al. | |
| 2020/0334520 A1* | 10/2020 | Chen | G06N 3/084 |
| 2020/0388402 A1* | 12/2020 | Frey | G06F 16/9537 |
| 2021/0067470 A1 | 3/2021 | Freed et al. | |
| 2021/0224754 A1 | 7/2021 | Zarakas et al. | |
| 2021/0399999 A1* | 12/2021 | Soiaporn | G06N 20/20 |
| 2022/0094648 A1* | 3/2022 | Le | G06F 18/22 |

OTHER PUBLICATIONS

Lair, et al., "User-in-the-loop Adaptive Intent Detection for Instructable Digital Assistant", In Proceedings of the 25th International Conference on Intelligent User Interfaces, Mar. 17, 2020, pp. 116-127.

* cited by examiner

TRAINING FRAMEWORK FOR AUTOMATED TASKS INVOLVING MULTIPLE MACHINE LEARNING MODELS

BACKGROUND

Artificial intelligence (AI) is increasingly being utilized by software applications and services to assist users with completing tasks. Examples where AI has been widely adopted for task completion include intelligent entities, such as digital assistants and chat bots. These intelligent entities may utilize various machine learning models to assist with identifying which tasks to complete and which parameters to apply when executing task actions.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Examples of the disclosure provide systems, methods, and devices for training machine learning models associated with an automated task framework. According to a first example, a computer-implemented method is provided. The computer-implemented method comprises maintaining an automated task framework comprising a plurality of machine learning models for executing a task; processing a first natural language input with two or more of the machine learning models; executing an action corresponding to a task intent identified from the first natural language input; receiving user feedback related to the execution of the action; processing the user feedback with a user sentiment engine; determining, from the processing of the user feedback, that one or more of the machine learning models that processed the first natural language input generated an incorrect output; determining a specific one of the machine learning models that generated the incorrect output; and training the specific one of the machine learning models based on the determination that the specific one of the machine learning models generated the incorrect output.

According to another example, a system is provided. The system comprises a memory for storing executable program code; and one or more processors, functionally coupled to the memory, the one or more processors being responsive to computer-executable instructions contained in the program code and operative to: maintain an automated task framework comprising a plurality of machine learning models for executing a task; process a first natural language input with two or more of the machine learning models; execute an action corresponding to a task intent identified from the first natural language input; receive user feedback related to the execution of the action; process the user feedback with a user sentiment engine; determine, from the processing of the user feedback, that one or more of the machine learning models that processed the first natural language input generated an incorrect output; determine a specific one of the machine learning models that generated the incorrect output; and train the specific one of the machine learning models based on the determination that the specific one of the machine learning models generated the incorrect output.

In another example, a computer-readable storage device is provided. The computer-readable storage device comprises executable instructions that, when executed by one or more processors, assists with training machine learning models in an automated task framework, the computer-readable storage device including instructions executable by the one or more processors for: accessing an automated task framework comprising a plurality of machine learning models for executing a task; processing a first natural language input with two or more of the machine learning models; executing an action corresponding to a task intent identified from the first natural language input; receiving user feedback related to the execution of the action; processing the user feedback with a user sentiment engine; determining, from the processing of the user feedback, that one or more of the machine learning models that processed the first natural language input generated an incorrect output; determining a specific one of the machine learning models that generated the incorrect output; and training the specific one of the machine learning models based on the determination that the specific one of the machine learning models generated the incorrect output.

BRIEF DESCRIPTION OF THE DRAWINGS

Non-limiting and non-exhaustive examples are described with reference to the following figures.

DETAILED DESCRIPTION

Figure 1:
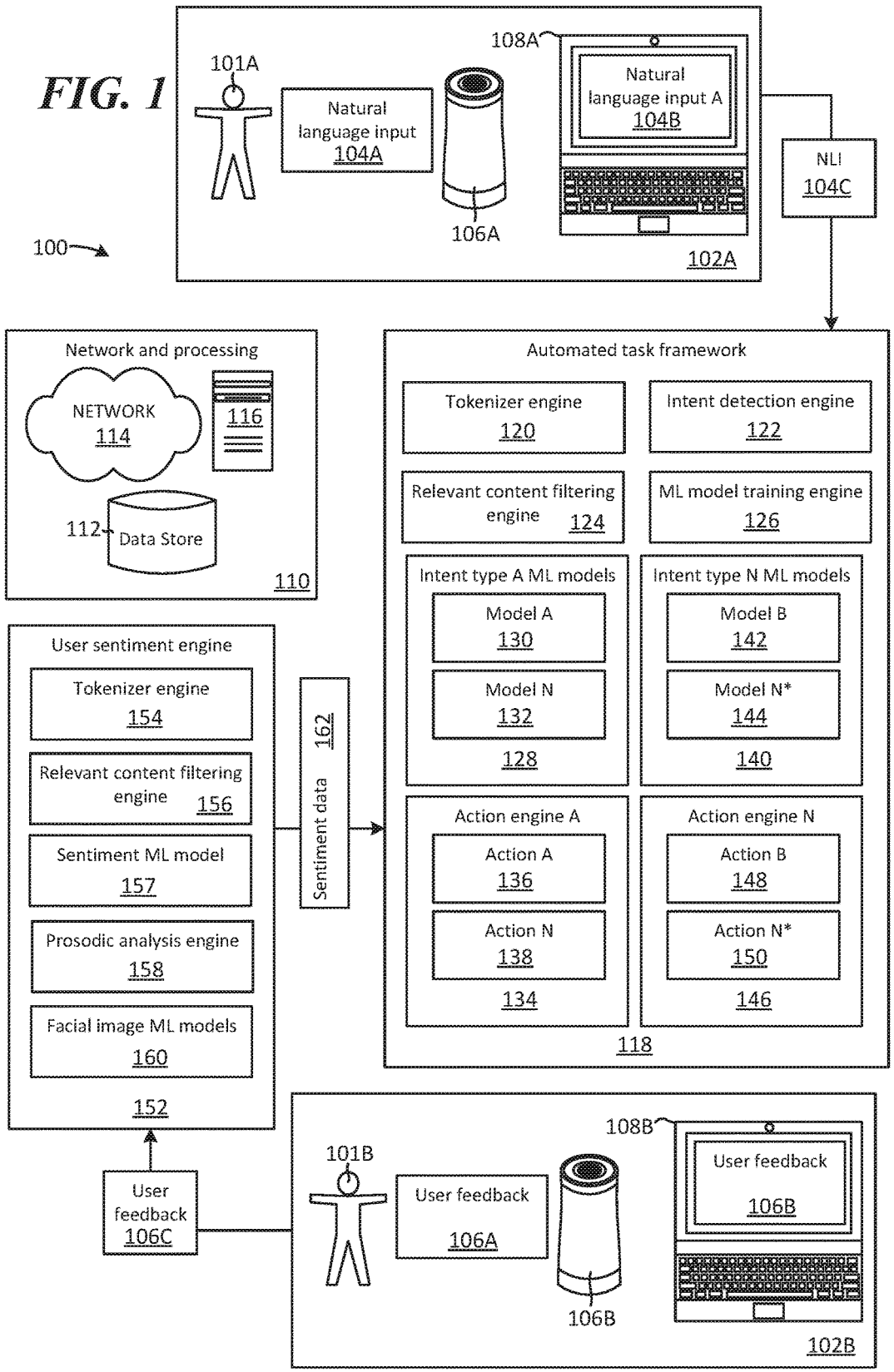
FIG. 1 is a schematic diagram illustrating an example distributed computing environment for training machine learning models associated with an automated task framework.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for training machine learning models associated with an automated task framework. An automated task framework may be associated with a digital assistant (e.g., Cortana) and/or one or more other entities that execute automated actions, such as chat bots, software applications, and/or task services. The automated task framework may be executed on one or more local devices associated with a user or in the cloud. In other examples, the automated task framework may be partially executed locally and partially executed in the cloud.

The automated task framework may be associated with one or more task types. Examples of task types the automated task framework may be associate with include an electronic calendar management task type, a service booking task type, a weather task type, and/or a shopping task type, among others. The automated task framework may include engines and/or machine learning models for processing user inputs related to one or more task types and executing actions related to those task types.

The automated task framework may process natural language inputs received from one or more devices that are associated with one or more user accounts. The automated task framework may apply one or more machine learning models to a natural language input to determine whether the natural language input includes a task intent, and if so, what specific type of task intent. The one or more machine learning models may comprise vector embedding models and/or neural networks that have been trained to classify natural language into intent types. In some examples, the automated task framework may process natural language inputs with a relevant content filtering engine. The relevant content filtering engine may identify content (e.g., text strings, words, phrases) in a natural language input that is relevant to a task intent and/or task intent type. The relevant content filtering engine may comprise a neural model comprising an intra-sentence aggregator, an inter-sentence aggregator, and a classifier. By applying the relevant content filtering engine to natural language inputs only portions of natural language inputs that are relevant to task execution need be further processed by downstream task-specific machine learning models, resulting in decreased processing costs and increased accuracy.

Upon identifying a task intent type associated with a natural language input, the automated task framework may further process that natural language input (or portions of the natural language input that have been determined to be relevant to the task intent) with one or more task-specific machine learning models. Each of the task-specific machine learning models may correspond to an intent parameter included in the natural language input. An intent parameter may comprise one or more strings (e.g., words, phrases, numbers, symbols) that are variable for executing an action by the automated task framework. For example, for a "schedule meeting" task type, intent parameters may include a type of meeting, a date of meeting, a time of meeting, and/or a duration of meeting. The task-specific machine learning models may comprise vector embedding models and/or neural networks that have been trained to determine whether a natural language input includes one or more strings that are specific to a specific type of action that relates to a determined intent type (e.g., task intent type).

Upon processing a natural language input with one or more task-specific machine learning models, the automated task framework may execute an action corresponding to the task intent identified from the natural language input. The executed action may comprise a plurality of execution parameters and each of the execution parameters may correspond to one of the plurality of intent parameters that were included in the natural language input.

The automated task framework may comprise or otherwise be associated with a user sentiment engine. The user sentiment engine may process user feedback related to actions that have been executed by the automated task framework. The user feedback may comprise natural language feedback, user image/video feedback, and/or user audio feedback. In examples where the user feedback comprises natural language feedback, the user sentiment engine may apply a relevant content filtering engine to the user feedback. The relevant content filtering engine may comprise an intra-sentence aggregator, an inter-sentence aggregator, and a classifier. The relevant content filtering engine applied by the user sentiment engine may have been trained to identify content that is relevant to user sentiment and/or filter out content that is not relevant to user sentiment. The relevant content filtering engine may apply one or more transformer-based models to the natural language input, or portions of a natural language input that have been identified as being relevant to user sentiment, to generate vector embeddings that may be processed with a neural network that has been trained to classify vector embeddings into one or more sentiment categories (e.g., positive sentiment, neutral sentiment, negative sentiment). In other examples, the user sentiment engine may score user sentiment on an analog scale rather than into specific categories.

In examples where there is no ambiguity as to which machine learning models of the automated task framework performed correctly and/or which machine learning models of the automated task framework performed incorrectly based on the processing of the user feedback with the user sentiment engine, the automated task framework may train the models without performing any user follow-up actions. For example, if there is no ambiguity as to which machine learning models performed correctly, the automated task framework may reward those machine learning models via positive reinforcement training and re-weighting of one or more nodes in corresponding neural networks via back propagation. Similarly, if there is no ambiguity as to which machine learning models performed incorrectly, the automate task framework may penalize those machine learning models via negative reinforcement training and re-weighting of one or more nodes in corresponding neural networks via back propagation.

If there is an ambiguity as to which machine learning model generated an incorrect output (e.g., performed incorrectly), the automated task framework may send a follow-up message to a user device associated with the user account that provided the natural language input. In some examples, the follow-up message may comprise a query to the user as to which portion (e.g., execution parameter) of the executed action was incorrect. Any received response may be processed by a natural language processing model for determining which machine learning models(s) generated an incorrect output. Thus, the follow-up message may query the user as to which machine learning model produced the incorrect output. Once a determination has been made as to which machine learning models performed correctly or incorrectly, the corresponding machine learning models may be penalized or reward accordingly (e.g., machine learning models that produced incorrect outputs may be penalized, machine learning models that produced correct outputs may be rewarded).

The systems, methods, and devices described herein provide technical advantages for training machine learning models associated with automated task completion. To identify which of a plurality of machine learning models that processed natural language from a user and lead to an incorrect action being executed by a task completion service, or incorrect parameters being included in an executed action, developers would typically need to review the natural language input such that the appropriate model(s) could be trained accordingly. Thus, training of these types of models has typically been performed, if at all, using labeled data by human judges. However, developers must maintain strict protocols related to user data and privacy, restricting their access to such inputs. As such, training machine learning models in frameworks that include multiple machine learning models in a closed and compliant environment is challenging. Similarly, when an action is executed incorrectly by an intelligent entity (e.g., a chat bot, a digital assistant) it is often difficult to determine which model(s) were responsible for the incorrect result, and which model(s) performed satisfactorily. Aspects described herein provide mechanisms for intelligently identifying which models performed their roles correctly or incorrectly by applying a user sentiment engine to user feedback, and in some instances sending follow-up queries back to the user based on determined user sentiment in relation to executed actions. By providing the ability to intelligently gauge user sentiment in relation to multiple machine learning models, aspects described herein can accurately identify which models to reward and which models to penalize, while respecting the privacy concerns of users that automated task completion services process data for. Additionally, the systems, methods, and devices described herein reduce processing costs by applying relevant content filtering engines to natural language inputs, such that only content that is relevant to identified task inputs is processed by downstream machine learning models for task completion, and only content that is relevant to user sentiment is processed by machine learning models applied in determining user sentiment. In addition to reducing processing costs, these content filtering engines also increase the accuracy of the downstream models that are applied to the natural language input data, by preemptively eliminating portions of user inputs that are irrelevant to the task at hand and may have otherwise been incorrectly identified as including an intent parameter or user sentiment.

FIG. 1 is a schematic diagram illustrating an example distributed computing environment 100 for training machine learning models associated with an automated task framework. Computing environment 100 includes user input sub-environment 102 (e.g., user input sub-environment 102A, user input sub-environment 102B), network and processing sub-environment 110, automated task framework 118, user sentiment engine 152, natural language input 104 (e.g., natural language input 104A, natural language input 104B, natural language input 104C) user feedback 106 (e.g., user feedback 106A, user feedback 106B), and sentiment data 162. User input sub-environment 102 includes user 101 (e.g., user 101A, user 101B), voice input device 106 (e.g., voice input device 106A, voice input device 106B), and computing device 108A (e.g., computing device 108A, computing device 108B). User computing sub-environment 102A and user computing sub-environment 102B are the same computing environment and include the same user and computing devices at different times in the process of task execution and machine learning training as further described below.

Network and processing sub-environment 110 includes data store 112, network 114, and server computing device 116. Any and all of the computing devices described herein may communicate with one another via a network such as network 114. Server computing device 116 is illustrative of one or more server computing devices that may execute computing operations described herein and/or host engines, models, or other data described herein. In some examples, server computing device 116 may execute operations associated with an automated task service, automated task framework 118, and/or one or more digital assistants. Some, none, or all of the frameworks, engines, models, and/or modules described herein may be executed and/or stored in the cloud (e.g., on one or more server computing devices such as server computing device 116). In other examples, some, none, or all of the frameworks, engines, models, and/or modules described herein may be executed and/or stored locally (e.g., on local devices such as voice input device 106 and computing device 108).

Data for one or more user accounts associated with automated task framework 118, an automated task service, automated task framework 118, a productivity application service or suite, and/or one or more other applications or services may be stored in data store 112. Users associated with user accounts that have data stored in data store 112 may have granted the automated task service and/or the automated task framework 118 with access to certain data generated or otherwise associated with their user accounts. The data may include user account identifiers, user preferences, and settings, for example. Data store 112 may further include electronic message data (e.g., email data, electronic document data, SMS messaging data), voice input data, and electronic calendar data associated with user accounts serviced by the automated task service and/or the automated task framework 118. Data store 112 may further include electronic data associated with group messaging/collaboration applications or services, social media applications or services, web browser applications or services, task management applications or services, to-do list applications or services, map applications or services, reservation applications or services, presentation applications or services, and spreadsheet applications or services, for example. In additional examples, data store 112 may include data associated with a digital assistant service that may be associated with the automated task framework 118 and/or an automated task service. The user data stored in data store 112 may be encrypted and stored in compliance with privacy rules and settings. In some examples, the user data may be scrubbed for personal identifiable information (PII). The PII scrubbing may be performed by one or more machine learning models such that no administrative or developer users need review or otherwise access user data that is associated with any user accounts.

The automated task framework 118 includes tokenizer engine 120, intent detection engine 122, relevant content filtering engine 124, machine learning model training engine 126, intent type A machine learning models 128 (including model A 130 and model N 132), action engine A 134 (including action A 136 and action N 138), intent type N machine learning models 140 (including model B 142 and model N* 144), and action engine N 146 (including action B 148 and action N* 150). The automated task framework 118 may be associated with one or more task types. Examples of task types that the automated task framework 118 may be associated with include an electronic calendar scheduling task type, a service booking task type, a weather task type, and/or a shopping task type, among others. The automated task framework 118 may include engines and/or machine learning models for processing user inputs related to one or more task types and executing actions related to those task types. Similarly, the automated task framework 118 may be associated with one or more digital assistants. A digital assistant may handle user inputs related to a single task type or a plurality of task types.

The automated task framework 118 may receive and process user inputs from user input devices (e.g., voice input device 106, computing device 108). In some examples, a user account associated with a user input device may provide permission (e.g., via settings, via explicit input) for the automated task framework 118 to process natural language inputs received by or generated on user input devices. In other examples, a user account associated with a user input device may indicate that a specific user input be directed to the automated task framework 118. Such an indication may comprise including an alias, account, or name of a digital assistant associated with automated task framework 118 in an input (e.g., voice input, electronic message input, electronic document input, operating system shell element input) to a user input device. Thus, in some examples, the automated task framework 118 may analyze all or a subset of data input on, received by, generated by, or accessed by a user input device associated with the automated task framework 118. In other examples, the automated task framework 118 may only analyze data that is received in association with an implicit or explicit command to process that data. An implicit command may comprise a user including a name of a digital assistant associated with the automated task framework 118 in a carbon copy field of an electronic message or a body of an electronic document or message. An explicit command may comprise a keyword or phrase including the name of a digital assistant associated with the automated task framework 118 that explicitly asks for performance of one or more actions or skills.

The automated task framework 118 processes user inputs (e.g., natural language input 104) with one or more of tokenizer engine 120, intent detection engine 122, and relevant content filtering engine 124. The automated task framework 118 may process sentiment data 162 with machine learning model training engine 126. The automated task framework 118 may tag and/or partition portions of a received natural language input as sentences utilizing tokenizer engine 120. As described herein the term "sentence" refers to one or more text strings (e.g., letters, numbers, symbols, words, phrases) that are designated as a sentence by tokenizer engine 120, and a "sentence" need not be a complete sentence. A "sentence" may comprise a complete sentence, a sentence fragment, one or more standalone words, one or more abbreviations, one or more acronyms, and any combination of the same.

Once tokenized, each sentence may be processed by one or more relevant content filtering engines, such as relevant content filtering engine 124. Relevant content filtering engine 124 may comprise one or more machine learning models that have been trained to identify content in a natural language input that is relevant to a specific task type and filter out content from a natural language input that is not relevant to that specific task type. In examples, relevant content filtering engine 124 may comprise a neural model comprising an intra-sentence aggregator, an inter-sentence aggregator, and a classifier. Relevant content filtering engine 124 may have been trained on manually classified datasets comprised of natural language inputs with sentences that have been tagged as relating to or not relating to a specific task type that relevant content filtering engine 124 is adapted to identify relevant content for. In additional examples, relevant content filtering engine 124 may be trained with user data indicating that relevant content filtering engine 124 correctly or incorrectly identified content in natural language inputs that is related to a specific task type that relevant content filtering engine 124 is adapted to identify relevant content for.

Relevant content filtering engine 124 may include an embedding layer for generating an embedding for each word in each tokenized sentence. The embedding layer may apply a contextual model to each sentence from the natural language input. In examples, the contextual model that is applied may comprise a transformer-based model (e.g., Bidirectional Encoder Representations from Transformers [BERT], Embeddings from Language Model [ELMo], Big-Bird).

Relevant content filtering engine 124 may further comprise a distinct sentence level information aggregation layer ("distinct sentence aggregation layer") for aggregating the embeddings for each word into a distinct embedding for each of the sentences. The distinct sentence aggregation layer may apply a neural network to the embeddings for each word. In examples, the neural network may comprise a gated recurrent unit (GRU) neural network or bidirectional GRU (bi-GRU) neural network. In other examples, the neural network may comprise a long short-term memory (LSTM) neural network or an attention-based aggregation method.

Relevant content filtering engine 124 may further comprise a contextual aggregation layer for aggregating each distinct embedding for each of the sentences into a contextual embedding for each of the sentences. In aggregating the distinct embeddings for each sentence, the contextual aggregation layer may apply a neural network to each distinct embedding fore each of the sentences. In examples, the neural network may comprise a GRU neural network, or a bi-GRU neural network. In other examples, the neural network may comprise an LSTM neural network or an attention-based aggregation method.

Relevant content filtering engine 124 may further comprise a scoring layer for scoring and ranking each of the sentences based on their relevance to a task type that relevant content filtering engine 124 is adapted to identify relevant content for and filter out irrelevant content for. In scoring and ranking each sentence, the scoring layer may apply a classifier function to each contextual embedding for each of the plurality of sentences (e.g., the embeddings generated by the contextual aggregation layer). In examples, the classifier function may comprise a sigmoid function. Other activation functions (e.g., tan h, softplus, softmax) may be utilized for scoring each sentence.

According to examples, only sentences with scores that are above a certain threshold may be further processed by the automated task framework 118. For example, the values that are calculated for each of the sentences for a natural language input (e.g., natural language input 104) via the scoring layer may be compared to a threshold value. If a sentence has a value that meets or exceeds the threshold value, that sentence may be further processed for task intent execution by the automated task framework 118 and/or a corresponding digital assistant. If a sentence has a value that does not meet or exceed the threshold value, the sentence may not be processed further. The threshold may be adjusted manually or automatically and can be tuned based on the requirements of downstream tasks.

Intent detection engine 122 may comprise one or more machine learning models that that have been trained to determine whether a natural language input is associated with one or more intent types. In some examples, intent detection engine 122 may receive only those sentences that have not been filtered out by relevant content filtering engine 124. In some examples, intent detection engine 122 may comprise a neural network that processes vector embeddings for one or more words or sentences included in a natural language input and classifies those vector embeddings as being associated with one or more intent types that the neural network has been trained to classify embedding vectors for. For example, intent detection engine 122 may receive one or more vector embeddings for one or more sentences that were not filtered out by relevant content filtering engine 124 and classify them as relating to one or more intent types. In some examples, the embeddings may be compressed prior to being processed by intent detection engine 122. For example, if intent detection engine 122 supports four intents but an embedding is a 760 dimensional vector, the vector may be compressed to a four dimensional vector. In some examples, the compression may be accomplished via application of linear dimensionality reduction models or neural network autoencoder models to a vector.

If a determination is made by intent detection engine 122 that a natural language input or the relevant portion(s) of a natural language input relate to a specific intent type, automated task framework may process that natural language input, or the relevant portion(s) of the natural language input, with one or more machine learning models that are specific for execution of one or more actions related to the specific intent type. For example, if a determination is made that a natural language input or the relevant portion(s) of a natural language input correspond to intent type A, the natural language input or the relevant portion(s) of the natural language input may be processed by intent type A machine learning models 128. Intent type A machine learning models 128 includes model A 130 and model N 132. Each of those models may comprise a neural network that has been trained to determine whether a natural language input includes one or more words or sentences that are specific to a specific type of action that relates to the intent type (intent type A). For example, if intent type A is an event scheduling intent type, model A 130 may be a machine learning model that has been trained to determine whether one or more words or sentences in a natural language input relate to a "schedule meeting" intent or action. Following that example, model N 132 may comprise one or more machine learning models that have been trained to determine whether one or more words or sentences in a natural language input comprise meeting parameters needed to execute the schedule meeting action. In another example, if intent type A is an event scheduling intent type, model A 130 may be a machine learning model that has been trained to determine whether one or more words or sentences in a natural language input relate to a "cancel meeting" intent or action. Following that example, model N 132 may comprise one or more machine learning models that have been trained to determine whether one or more words or sentences in a natural language input comprise meeting parameters needed to execute the cancel meeting action.

Intent type N machine learning models, which includes model B 142 and model N*, simply illustrate that the automated task framework 118 may include processing resources and models for identifying multiple task intent types and executing multiple actions based on those multiple task intent types.

If a determination is made that a natural language input relates to a specific intent type action, and one or more intent parameters have been identified for executing that action the automated task framework 118, may automatically execute the action. This is illustrated by action engine A 134, which includes action A 136 and action N 138. For example, if a determination is made by model A 130 that a natural language input corresponds to a "schedule meeting" task type, and model N 132 (which may comprise one or more machine learning models and/or neural networks) extracted intent parameters including a type of meeting, a date of meeting, a time of meeting, and/or a duration of meeting, the automated task framework 118 may execute action A 136, which may comprise executing one or more schedule meeting operations utilizing the extracted intent parameters in association with one or more electronic calendars accessed on one or more local devices and/or a remote data stores, such as data store 112. An executed action may comprise a plurality of execution parameters and each of the plurality of execution parameters may correspond to one of the plurality of intent parameters that were extracted from the natural language input. The one or more electronic calendars may be accessed on the local devices and/or the remote data store via one or more APIs and/or one or more user account credentials or keys associated with the one or more electronic calendars. In another example, if a determination is made by model A 130 that a natural language input corresponds to a "cancel meeting" task type, and model N 132 (which may comprise one or more machine learning models and/or neural networks) extracted intent parameters including a meeting date and a meeting time, the automated task framework 118 may execute action N 138, which may comprise executing one or more cancel meeting operations utilizing the extracted intent parameters in association with one or more electronic calendars accessed on one or more local devices and/or remote data stores, such as data store 112.

Action engine N 146, which includes action B 148 and action N* 150, simply illustrates that the automated task framework 118 may include processing resources and models for identifying multiple task intent types and executing multiple actions based on those multiple task intent types.

Upon execution of an action (e.g., action A 136, action N 138, action B 148, action N* 150), a user may provide feedback to the automated task framework 118 via a user input device (e.g., voice input device 106, computing device 204). The user feedback may comprise explicit feedback, such as a spoken input or textual input (e.g., "thank you, [digital assistant]", "you scheduled the meeting for the wrong day", "wow you messed that one up, [digital assistant]"). In other examples, the user feedback may comprise implicit feedback, such as facial expressions or vocal feedback that isn't in the form of traditional language (e.g., grunts, groans, hums, sighs). In additional examples, the user feedback may comprise asking the automated task framework 118 or a digital assistant associated with the automated task framework 118 to re-execute an executed action within a threshold duration of time from the action's original execution, while providing one or more different intent parameters in that request. The request for re-execution indicates that the user was unhappy with (e.g., has a negative sentiment) the original action that was executed.

The user feedback (e.g., user feedback 106) may be provided to user sentiment engine 152. Although user sentiment engine 152 is illustrated as being separate from the automated task framework 118, it should be understood that in other examples user sentiment engine 152 may be included in the automated task framework 118. In examples where the user feedback comprises a natural language input, tokenizer engine 154 may be applied to that natural language input. Tokenizer engine 120 may tag and/or partition portions of a received natural language input as sentences such that the natural language input may be more efficiently processed. As previously noted, as described herein, a sentence may comprise a complete sentence, a sentence fragment, one or more standalone words, one or more abbreviations, one or more acronyms, and any combination of the same. Further, a sentence may include numbers, symbols, and other special characters.

Once tokenized, user sentiment engine 152 may process the natural language user feedback with relevant content filtering engine 156. Relevant content filtering engine 124 may comprise one or more machine learning models that have been trained to identify content in a natural language input that is relevant to a user's sentiment and filter out content from a natural language input that is not relevant to a user's sentiment. In some examples, relevant content filtering engine 124 may comprise one or more machine learning models that have been trained to identify content in a natural language input that is relevant to a user's sentiment in relation to a task action that was executed and filter out content from a natural language input that is not relevant to a user's sentiment in relation to a task action that was executed. Thus, relevant content filtering engine 156 distills user feedback to only information that is relevant to user sentiment.

In examples, like relevant content filtering engine 124, relevant content filtering engine 156 may comprise a neural model comprising an intra-sentence aggregator, an inter-sentence aggregator, and a classifier. Content filtering engine 156 may include an embedding layer for generating an embedding for each word in each tokenized sentence, a distinct sentence level information aggregation layer for aggregating the embeddings for each word into a distinct embedding for each of the sentences, a contextual aggregation layer for aggregating each distinct embedding for each of the sentences into a contextual embedding for each of the sentences, and a scoring layer for scoring and ranking each of the sentences based on their relevance to a user's sentiment. Relevant content filtering engine 156 may have been trained on manually classified datasets comprised of natural language inputs with sentences that have been tagged as relating to or not relating to specific sentiment types and/or sentiment types related to specific automated actions. In additional examples, relevant content filtering engine 156 may be trained with user data indicating that relevant content engine 156 correctly or incorrectly identified a user's sentiment.

Sentiment machine learning model 157 may process the user feedback, or only the portions of the natural language user feedback that were determined by relevant content filtering engine 156 to be relevant to user sentiment. Thus, by first processing the user feedback with relevant content filtering engine 156 processing costs are reduced in that a smaller amount of user feedback data need be further processed by downstream models (e.g., sentiment machine learning model 157). The processing cost savings increases with the amount of data not relevant to user sentiment included in user feedback. Sentiment machine learning model 157 may comprise one or more machine learning models that have been trained to classify user feedback (e.g., natural language input feedback, embeddings generated from natural language input feedback) into one or more sentiment categories. For example, sentiment machine learning model 157 may comprise a neural network that has been trained to classify user feedback into positive, neutral, and negative sentiment categories. In other examples, sentiment machine learning model 157 may score user sentiment on an analog scale rather than into specific categories, where a positive score corresponds to a positive user sentiment (the higher the value the more positive the sentiment), a negative score corresponds to a negative user sentiment (the more negative the value the more negative the sentiment), and a zero score (or score within a threshold value of zero) corresponds to a neutral user sentiment.

User sentiment engine 152 may apply prosodic analysis engine 158 to user feedback that comprises audio input. For example, prosodic analysis engine 158 may comprise one or more machine learning models (e.g., audio neural networks) that have been trained to classify prosodic features (e.g., intonation, stress, rhythm, loudness, pitch, duration) of a user's voice into sentiment categories (e.g., positive sentiment, negative sentiment, neutral sentiment, sarcastic sentiment, mad sentiment, excited sentiment). In some examples, sentiment machine learning model 157 may process not only natural language inputs to classify user feedback, but also the output from prosodic analysis engine 158 in determining those classifications. For example, a user input that states "great job, [digital assistant]" if only processed into word or sentence embeddings may end up being classified as a positive sentiment by sentiment machine learning model 157. However, if a sarcastic classification of that input, as determined by prosodic analysis engine 158, is also processed by sentiment machine learning model 157, a negative sentiment classification for that user feedback may be determined. In some examples, rather than sentiment machine learning model 157 processing the outputs from prosodic analysis engine 158, the outputs from sentiment machine learning model 157 (e.g., from natural language input processing) may be combined with the outputs from prosodic analysis engine 158 (e.g., from audio input processing) by user sentiment engine 152.

User sentiment engine 152 may apply facial image machine learning models 160 to user feedback that comprises image or video input. For example, facial image machine learning models 160 may comprise one or more machine learning models (e.g., image neural networks) that have been trained to classify facial image features into sentiment categories (e.g., positive sentiment, negative sentiment, neutral sentiment, sarcastic sentiment, mad sentiment, excited sentiment). In some examples, sentiment machine learning model 157 may process not only natural language inputs to classify user feedback, but also the output from facial image machine learning models 160 in determining those classifications. For example, a negative sentiment determined by facial image machine learning models 160 in combination with a negative sentiment determined from processing a natural language input by sentiment machine learning model 157 may increase the degree of negativity of the sentiment. Similarly, a positive sentiment determined by facial image machine learning models 160 in combination with a positive sentiment determined from processing a natural language input by sentiment machine learning model 157 may increase the degree of positivity of the sentiment. In some examples, rather than sentiment machine learning model 157 processing the outputs from facial image machine learning models 160, the outputs from sentiment machine learning model 157 (e.g., from natural language input processing) may be combined with the outputs from facial image machine learning models 160 (e.g., from image or video input processing) by user sentiment engine 152.

Upon processing user feedback with user sentiment engine 152, sentiment data 162 may be provided to the automated task framework 118. Sentiment data 162 may comprise a user sentiment score generated by user sentiment engine 152 or a user sentiment classification (e.g., positive sentiment, neutral sentiment, negative sentiment) generated by user sentiment engine 152. The automated task framework 118 may determine from sentiment data 162 that one or more machine learning models that processed the natural language input 104 generated an incorrect output. For example, if sentiment data 162 comprises a negative sentiment classification, a negative sentiment score, or a negative sentiment score below a threshold value, automated task framework 118 may determine that one or more machine learning models (e.g., model A 130, model N 132, model B 142, model N* 144) that processed the natural language input 104 generated an incorrect output. In other examples, the automated task framework 118 may determine from sentiment data 162 that one or more machine learning models (e.g., model A 130, model N 132, model B 142, model N* 144) that processed the natural language input 104 generated a correct output. For example, if sentiment data 162 comprises a positive sentiment classification, a positive sentiment score, or a positive sentiment score above a threshold value, the automated task framework 118 may determine that one or more machine learning models (e.g., model A 130, model N 132, model B 142, model N* 144) that processed the natural language input 104 generated a correct output. Similarly, if sentiment data 162 comprises a neutral sentiment classification, a neutral sentiment score, or a score within a threshold value from a neutral value, the automated task framework 118 may determine that one or more machine learning models (e.g., model A 130, model N 132, model B 142, model N* 144) that processed the natural language input 104 generated a correct output.

In some examples, sentiment data 162 may comprise an indication of which of the one or more of the machine learning models (e.g., model A 130, model N 132, model B 142, model N* 144) that processed the natural language input 104 generated an incorrect and/or correct output. For example, user feedback 106 may indicate that a specific machine learning model was a factor in the automated task framework 118 executing an incorrect action in relation to a user's intent and that indication may be included in sentiment data 162. As an example, if user feedback 106 includes the text "no, the meeting should be an hour long", sentiment data 162 may include an indication that a machine learning model that has been trained to determine whether words or sentences in a natural language input comprise a meeting duration parameter generated an incorrect output. In another example, if user feedback 106 includes the text "no [digital assistant], please reschedule the meeting for [a different day or week]", sentiment data 162 may include an indication that a machine learning model that has been trained to determine whether words or sentences in a natural language input comprise a meeting time or date parameter generated an incorrect output.

In examples where there is no ambiguity as to which one or more machine learning models generated an incorrect output leading to a negative user sentiment, machine learning training engine 126 may, based on analyzing sentiment data 162, train one or more machine learning models that generated the incorrect output by providing negative reinforcement to those one or more models. In examples where the one or more machine learning models comprise neural networks, the training may comprise modifying weights of one or more nodes in one or more neural networks via back propagation. Additionally, in examples where there is no ambiguity as to which one or more machine learning models generated an incorrect output leading to a negative user sentiment, machine learning training engine 126 may, based on analyzing sentiment data 162, train one or more machine learning models that did not generate the incorrect output (e.g., machine learning models for which the user had a neutral sentiment, machine learning models for which the user had a positive sentiment) by providing positive reinforcement to those one or more models. In examples where the one or more machine learning models comprise neural networks, the training may comprise modifying weights of one or more nodes in one or more neural networks via back propagation.

In some examples, automated task framework 118 may determine that there is an ambiguity as to which machine learning model generated an incorrect output leading to negative user sentiment. In such examples, the automated task framework 118 may generate and send a follow-up message to a user device associated with the user account that provided the natural language input (e.g., natural language input 104). In some examples, the follow-up message may comprise a query to the user (e.g., user 101) as to which portion of the executed action was incorrect. Any received response may be processed by a natural language processing model for determining which machine learning model(s) generated an incorrect output. Thus, the follow-up message may query the user as to which machine learning model produced the incorrect output. In some examples, the follow-up message may include one or more intent parameters and/or execution parameters that the user may select or indicate were incorrectly processed or included in an executed action by the automated task framework 118. The automated task framework 118 may then determine from the one or more intent parameters and/or execution parameters that the user selected or indicated were incorrectly processed or included in an executed action, which corresponding one or more machine learning models generated an incorrect output. In some examples, the intent and/or execution parameters included in the follow-up message may be included in a software application surface and the intent and/or execution parameters may comprise links that are selectable for sending (e.g., via an API, via a distributed computing network) feedback directly to automated task framework 118. In additional examples, a user may respond to the automated task framework 118 or a corresponding digital assistant via a text or verbal input indicating which intent and/or execution parameters were incorrectly generated output.

Figure 2:
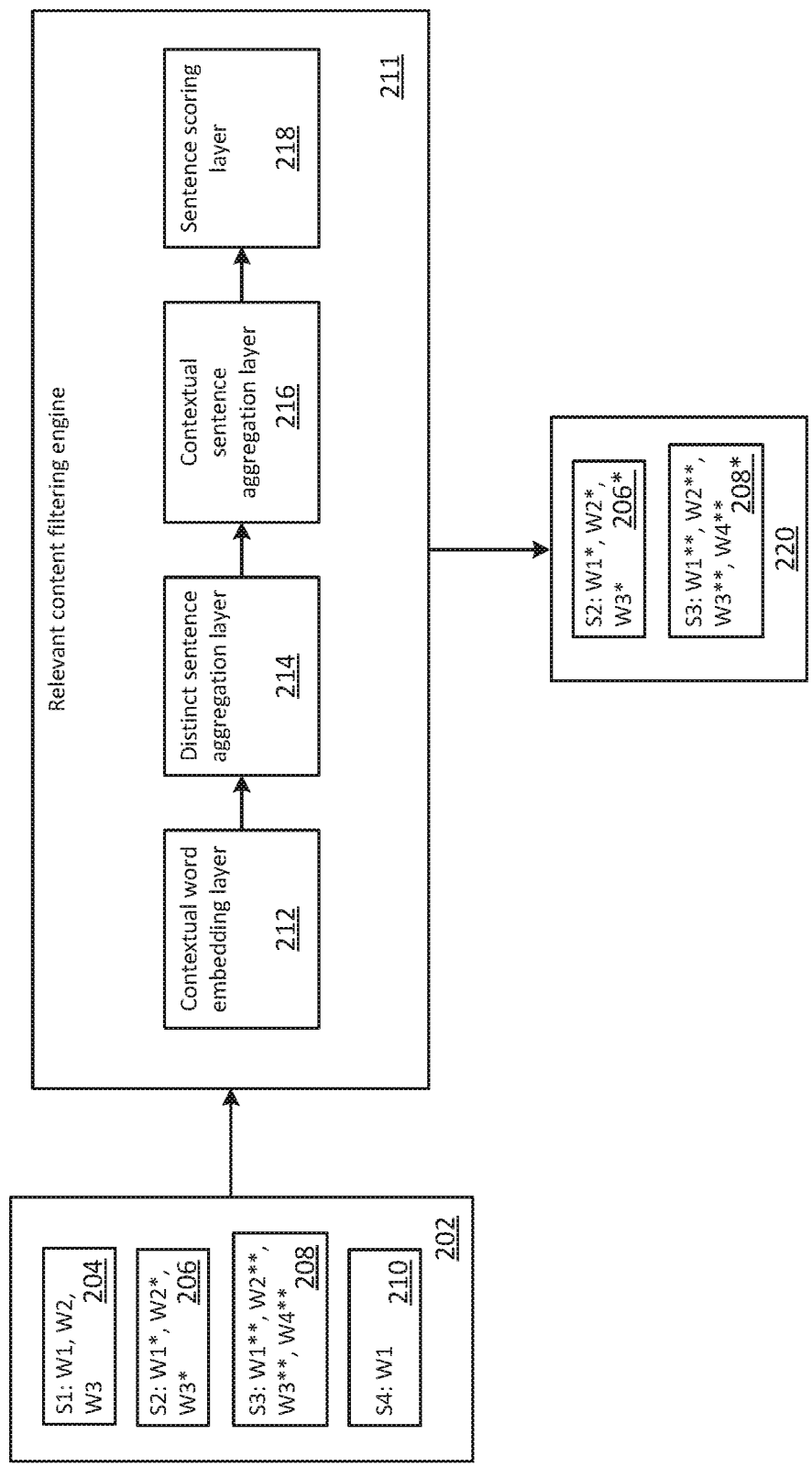
FIG. 2 illustrates layers of a relevant content filtering engine for identifying relevant content from a natural language input.

FIG. 2 illustrates layers of a relevant content filtering engine 211 for identifying relevant content from a natural language input. Relevant content filtering engine 211 is illustrative of both relevant content filtering engine 124 and relevant content filtering engine 156. The difference being that relevant content filtering engine 124 has been trained to identify content that is relevant to a task intent and filter out content that is irrelevant to a task intent, while relevant content filtering engine 156 has been trained to identify content that is relevant to user sentiment and filter out content that is irrelevant to user sentiment. Relevant content filtering engine 211 includes contextual word embedding layer 212, distinct sentence aggregation layer 214, contextual sentence aggregation layer 216, and sentence scoring layer 218. Relevant content filtering engine 211 may comprise a neural model comprising an intra-sentence aggregator (e.g., contextual word embedding layer 212 and distinct sentence aggregation layer 214), an inter-sentence aggregator (e.g., contextual sentence aggregation layer 216), and a classifier (e.g., sentence scoring layer 218). Relevant content filtering engine 211 receives sentences 202 from an email, chat window of a software application, operating system shell element (e.g., search bar), electronic document surface, voice input, or other natural language input. In this example, sentences 202 includes four sentences, sentence one 204, sentence two 206, sentence three 208, and sentence four 210. Sentences 202 may correspond to natural language input 104 or user feedback 106. In additional examples, sentences 202 may correspond to a natural language user input received in response to the automated task framework and/or a digital assistant query to a user account asking for clarification regarding an ambiguity as to a machine learning model that generated an incorrect output or lead to execution of an incorrect action.

Each of sentences 202 is processed by relevant content filtering engine 211. Contextual word embedding layer 212 generates an embedding for each word in each of sentences 202. In generating an embedding for each word, contextual word embedding layer 212 may apply a contextual model to each of sentences 202. In examples, the contextual model that is applied may comprise a transformer-based model (e.g., BERT, ELMo, BigBird).

Distinct sentence aggregation layer 214 aggregates the embeddings for each word in sentences 202 into distinct embeddings for each of sentences 202. In aggregating the embeddings for each word, distinct sentence aggregation layer 214 may apply a neural network to the embeddings for each word. In examples, the neural network may comprise a GRU neural network or a bi-GRU neural network. In other examples, the neural network may comprise a LSTM neural network.

Contextual sentence aggregation layer 216 aggregates each distinct embedding for each of sentences 202 into a contextual embedding for each of sentences 202. In aggregating the distinct embeddings for each sentence, contextual sentence aggregation layer 216 may apply a neural network to each distinct embedding for each of sentences 202. In examples, the neural network may comprise a GRU neural network or a bi-GRU neural network. In other examples, the neural network may comprise a LSTM neural network.

Sentence scoring layer 218 scores and ranks each of sentences 202 based on their relevance to a task intent (in the case where the engine 211 corresponds to relevant content filtering engine 124), or a user sentiment (in the case where the engine 211 corresponds to relevant content filtering engine 156). In scoring each of the sentences 202, sentence scoring layer 218 may apply a classifier function to each contextual embedding for each of the plurality of sentences (e.g., the embeddings generated by contextual sentence aggregation layer 216). In examples, the classifier function may comprise a sigmoid function. Other activation functions (e.g., tan h, softplus, softmax) may be utilized for scoring each sentence. In some examples, the model may be trained with a binary cross entropy loss using gold notated relevance scores. Other methodologies of training the engine may include utilizing a margin-based hinge loss function.

In this example, relevant content filtering engine 211 has determined that sentences 220 (e.g., sentence 206\* corresponding to sentence 206, and sentence 208\* corresponding to sentence 208), are relevant to either a task intent (e.g., if engine 211 corresponds to relevant content filtering engine 124) or user sentiment (in the case where engine 211 corresponds to relevant content filtering engine 156). Thus, relevant content filtering engine 211 filters out sentence 204 and sentence 210 as not being relevant.

The example where relevant content filtering engine 211 corresponds to relevant filtering engine 124, sentences 220 may then be processed by intent type machine learning models corresponding to the task intent type that relevant content filtering engine 211 has been trained to identify relevant content for. For example, if relevant content filtering engine 211 has been trained to identify relevant content related to task intent type A, sentences 220 may be processed by intent type A machine learning models 128. Alternatively, if relevant content filtering engine 211 has been trained to identify relevant content related to task intent type N, sentences 220 may be processed by intent type N machine learning models 140. In the example where relevant content filtering engine 211 corresponds to relevant filtering engine 156, sentences 220 may then be processed by sentiment machine learning model 157.

Figure 3:
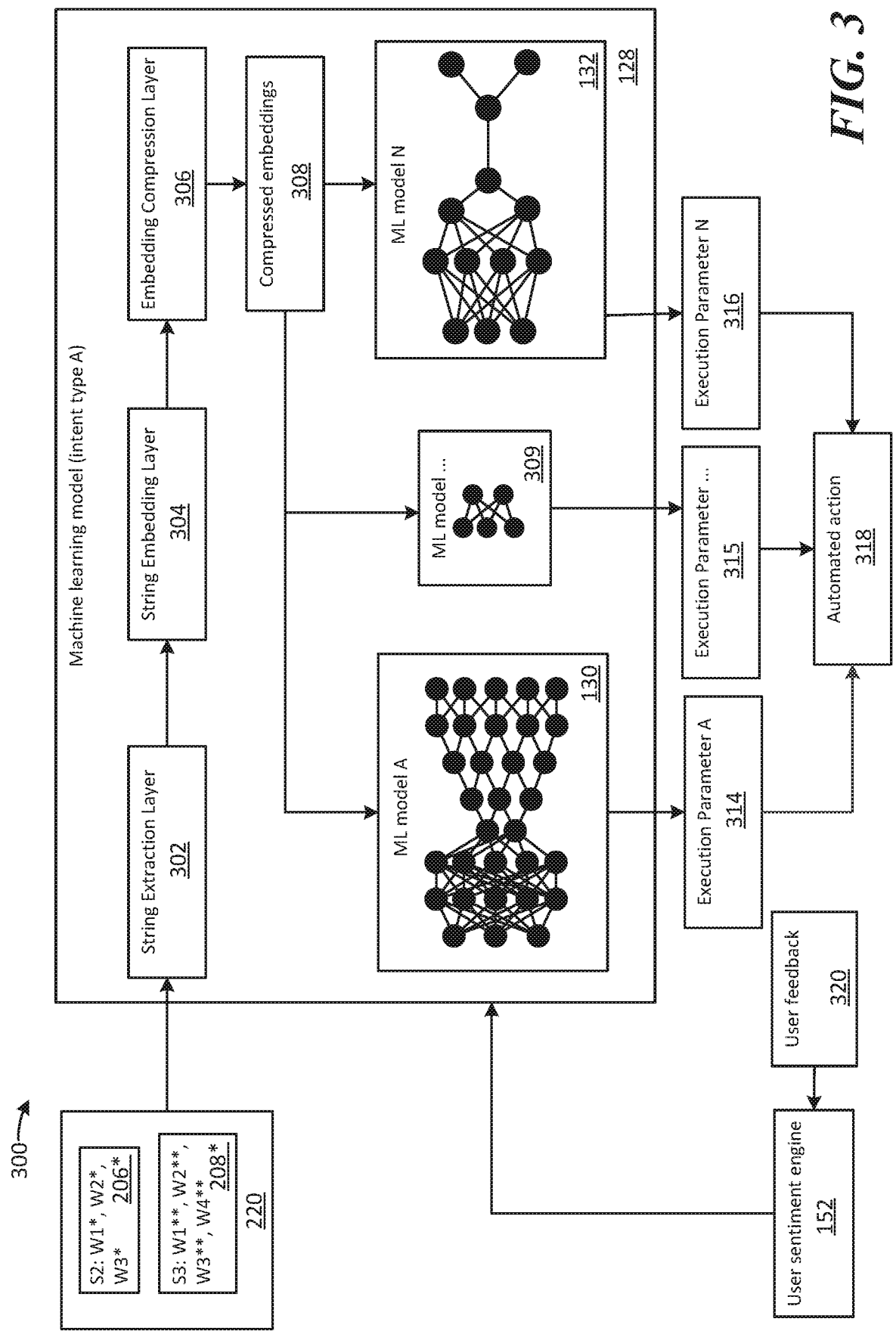
FIG. 3 is a block diagram illustrating the training of machine learning models associated with a specific intent type.

FIG. 3 is a block diagram 300 illustrating the training of machine learning models associated with a specific intent type. Block diagram 300 includes sentences 220, which includes sentence 206\* and sentence 208\*; intent type A machine learning model 128, which includes string extraction layer 302, string embedding layer 304, embedding compression layer 304, compressed embeddings 308, machine learning model A 130, machine learning model " . . . " 309, and machine learning model N 132. Block diagram 300 further includes execution parameter A 314, execution parameter " . . . " execution parameter N 316, automated action 318, user feedback 320, and user sentiment engine 152.

In this example, intent detection engine 122 has already determined that a natural language input including sentences 202 corresponds to intent type A. As such, sentences 202 are processed by intent type A machine learning models 128. Machine learning model A 130, machine learning model " . . . " 309, and machine learning model N 132 comprise neural networks that have been trained to determine whether a natural language input (e.g., sentences 220) includes one or more text strings, words, or sentences that relate to a specific type of action for an intent type (e.g., intent type A). Machine learning model " . . . " 309 illustrates that there may be any number more than two machine learning models in intent type A machine learning models 128. As an example, if intent type A is an event scheduling intent type, machine learning model A 130 may be a neural network that has been trained to determine whether one or more words or sentences of a natural language input (e.g., sentences 220) relate to a "schedule meeting" intent or action. Following that example, machine learning model N 132 may comprise one or more machine learning models that have been trained to determine whether one or more words or sentences in a natural language input (e.g., sentences 220) comprise meeting parameters needed to execute the schedule meeting action. In another example, if intent type A is an event scheduling intent type, machine learning model A 130 may be a neural network that has been trained to determine whether one or more words or sentences in a natural language input (e.g., sentences 220) relate to a "cancel meeting" intent or action. Following that example, machine learning model 132 may comprise a neural network that has been trained to determine whether one or more words or sentences in a natural language input (e.g., sentences 220) comprise meeting parameters needed to execute the cancel meeting action.

In examples where an entire natural language input is received by intent type A machine learning model 128, string extraction layer 302 may extract strings from that natural language input by applying one or more tokenization rules. In examples where relevant content filtering engine 124 has been applied to a natural language input (as is the case with the illustrated example), the identified relevant strings/sentences may bypass string extraction layer 302 and be provided directly to string embedding layer 304. String embedding layer 304 may embed sentences 220 or receive the embeddings for those strings that were generated by relevant content filtering engine 124. The embeddings may be generated via application of a transformer-based model to sentences 220. In some examples, the embeddings may be transformed via compression operations performed by embedding compression layer 306. The compression may comprise application of a linear dimensionality reduction model or neural network autoencoder models to the vectors corresponding to the embeddings. In some examples, the embeddings/vectors may be compressed to a number of dimensions corresponding to a number of classifications that each of machine learning model A 130 and machine learning model N 132 have been trained to output values for. For example, if machine learning model A 130 has been trained to output values for three electronic calendar task intent types (e.g., schedule meeting intent type, cancel meeting intent type, reschedule meeting intent type), a first set of vector embeddings for sentences 220 may be compressed to three dimensions. Similarly, if machine learning model N 132 has been trained to output values for four intent parameters related to a schedule meeting intent (e.g., time, date, duration, meeting type), a second set of vector embeddings for sentences 220 may be compressed to four dimensions. In other examples, the embeddings may be processed by the machine learning models (e.g., machine learning model A 130 and machine learning model N 132) in their non-compressed form. The embeddings (compressed or uncompressed) are then processed by machine learning model A 130 and/or machine learning model N 132.

In this example, machine learning model A 130 identifies at least one intent parameter from the processing of the embeddings and identifies a corresponding execution parameter (e.g., execution parameter A 314) for execution of an automated action (e.g., automated action 318). Similarly, machine learning model N identifies at least one intent parameter from the processing of the embeddings and identifies a corresponding execution parameter (e.g., execution parameter N 316) for execution of the automated action (e.g., automated action 318). Execution parameter " . . . " 315 illustrates that there may be any number more than two execution parameters output by intent type A machine learning model 128. However in some examples, there may be fewer than two execution parameters output by intent type A machine learning model 128. As a specific example, machine learning model A 130 may determine that sentence 206* comprises a schedule meeting intent parameter, and therefore execution parameter A 314 may correspond to scheduling of a meeting. Following that example, machine learning model N 132 may determine that sentence 208* comprises a meeting date intent parameter, and therefore execution parameter N 316 may correspond to a meeting date that the meeting is to be scheduled on. As such, automated action 318 may comprise the automatic scheduling, by a digital assistant and/or the automated task framework 118 for the determined meeting date (e.g., execution parameter N 316).

Once automated action 318 is performed, user feedback 320 is provided to user sentiment engine 152. If a determination is made by user sentiment engine 152 that the user has positive or neutral sentiment related to automated action 318, each of machine learning model A 130 and machine learning model 132 may be rewarded via positive reinforcement training. Alternatively, if user sentiment engine 152 determines that user feedback 320 includes an unambiguous indication that one or both of machine learning model A 130 or machine learning model N 132 generated an incorrect output, the indicated machine learning model(s) may be penalized via negative reinforcement training, while any machine learning models that received positive or neutral sentiment may be rewarded via positive reinforcement training.

In examples, where user sentiment engine 152 determines that there is an ambiguity as to which of multiple models produced an incorrect output, a digital assistant, user sentiment engine 152, and/or the automated task framework 118 may query the user as to which model generated the incorrect output. This query may comprise a message (text or audio) as to which intent parameter or execution parameter lead to an error in the automated action (e.g., automated action 318).

Figure 4:
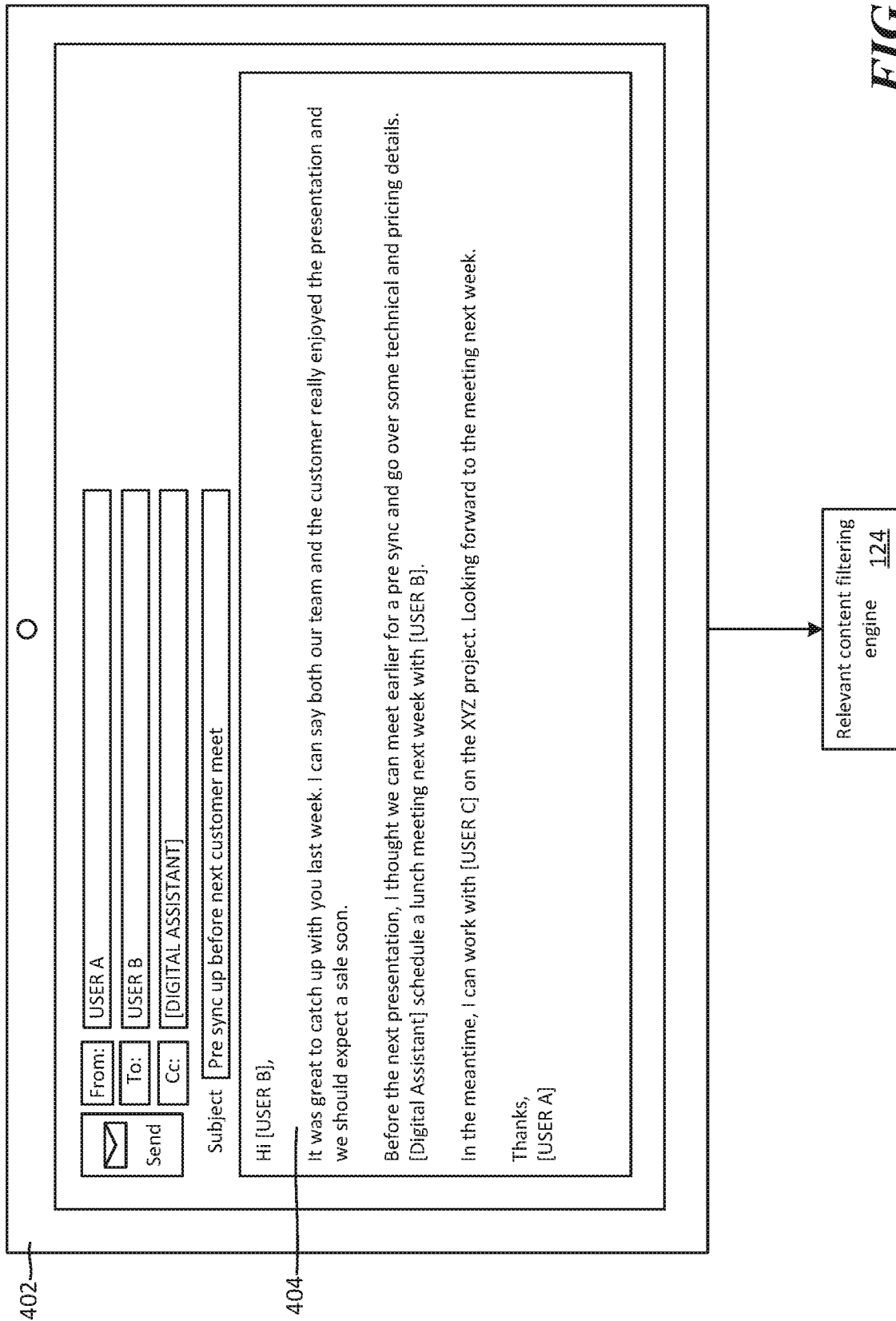
FIG. 4 illustrates a computing device that displays an email comprising a natural language input that may be processed by an automated task framework.

FIG. 4 illustrates a computing device 402 that displays an email comprising a natural language input 404 that may be processed by an automated task framework. The email includes user A in the "from" field, user B in the "to" field, "[digital assistant]" in the "cc" field, and the subject line "Pre sync up before next customer meet". The natural language input 404 states: "Hi [USER B], It was great to catch up with you last week. I can say both our team and customer really enjoyed the presentation and we should expect a sale soon. Before the next presentation, I thought we can meet earlier for a pre sync and go over some technical and pricing details. [Digital Assistant] schedule a lunch meeting next week with [USER B]. In the meantime, I can work with [USER C] on the XYZ project. Looking forward to the meeting next week. Thanks, [USER A]".

In this example, the automated task framework 118 is associated with the digital assistant. The automated task framework 118 may automatically receive natural language inputs that include the digital assistant (e.g., in the natural language input, in the body of an email that includes the natural language input, in a "to" field of an email that includes the natural language input, in a "cc" field of an email that includes the natural language input). In other examples, the automated task framework 118 may be associated with one or more entities other than a digital assistant and the automated task framework 118 may process natural language inputs that are provided to the automated task framework 118 by those entities. For example, the automated task framework 118 may be associated with chat bots, software applications, and task services, among other AI entities.

In this example, natural language input 404 is received by the automated task framework 118 based on including "[DIGITAL ASSISTANT]" in the "cc" field of the email As such, natural language input 404 is processed by relevant content filtering engine 124, as well as other models described herein. Details related to exemplary processing that may be performed on natural language input 404 is provided below in relation to FIG. 5.

Figure 5:
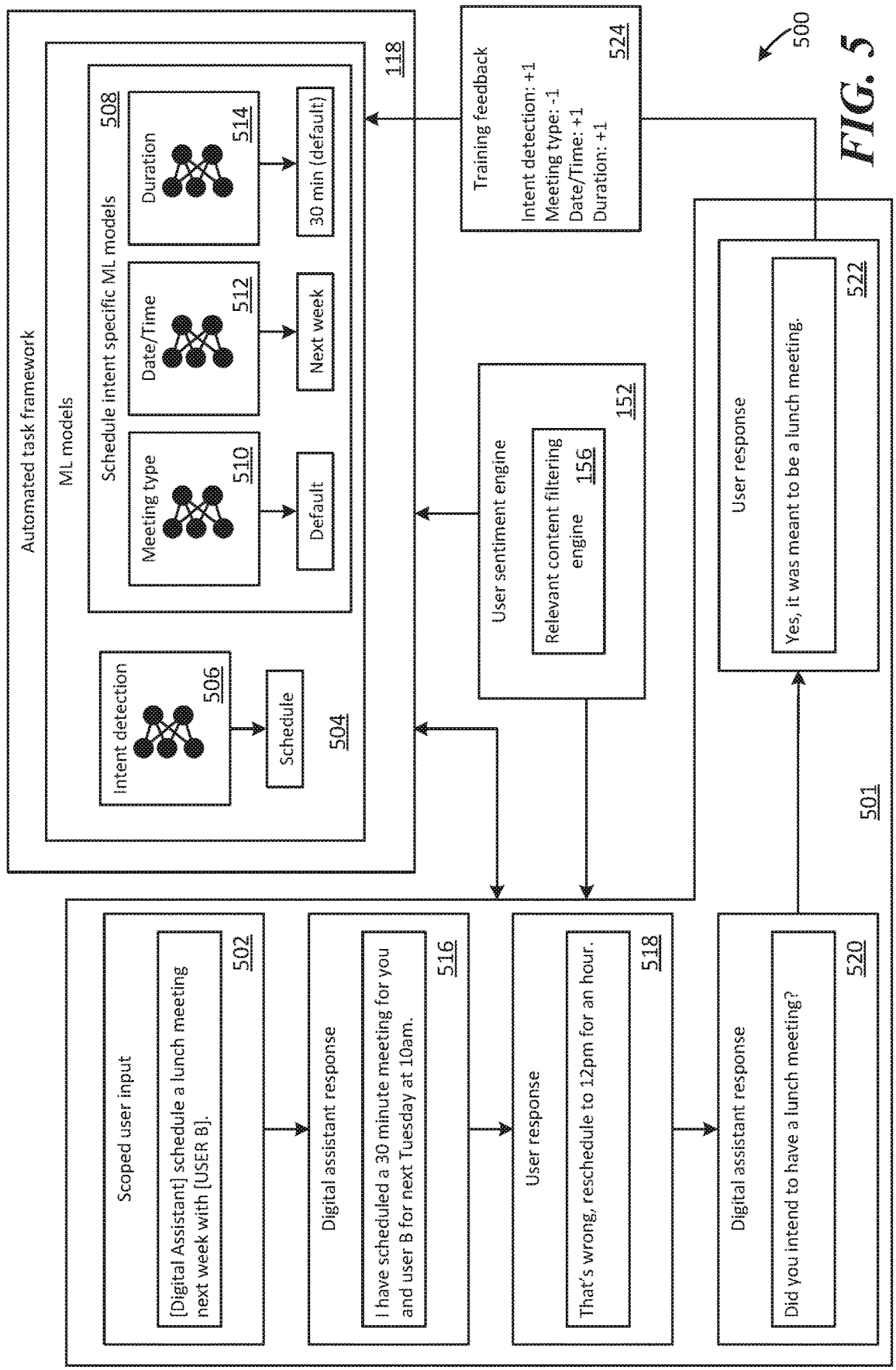
FIG. 5 is a block diagram illustrating inputs and outputs to and from an automated task service related to the email of FIG. 4 and the training of machine learning models associated with that email.

FIG. 5 is a block diagram 500 illustrating inputs and outputs to and from an automated task service related to the email of FIG. 4 and the training of machine learning models associated with that email. Content filtering engine 124 has processed natural language input 404. In this example, content filtering engine 124 comprises a machine learning model (e.g., a neural model comprising an intra-sentence aggregator, an inter-sentence aggregator, and a classifier) that has been trained to identify content that is relevant to electronic calendar event management. Block diagram 500 includes communication sub-environment 501, which comprises inputs and responses to and from a digital assistant associated with the automated task framework 118.

Content filtering engine 124 identifies scoped user input 502 as being relevant to electronic calendar event management. Scoped user input comprises the sentence "[Digital Assistant] schedule a lunch meeting next week with [USER B]."

Scoped user input 502 is provided to a plurality of machine learning models 504 in the automated task framework 118 that are associated with electronic calendar event management. As an example, machine learning models 504 may correspond to intent type A machine learning models 128 or intent type N machine learning models 140. In other examples, intent detection model 506 may correspond to intent detection engine 122, and schedule intent specific machine learning models 508 may correspond to intent type A machine learning models 128 or intent type N machine learning models 140. Machine learning models 504 include intent detection model 506 and schedule intent specific machine learning models 508. That is, scoped user input 502 may first be processed by intent detection model 506, which may comprise a neural network that has been trained to classify natural language inputs into one or more electronic calendar event management intent types (e.g., schedule meeting type, cancel meeting type, reschedule meeting type). In this example, intent detection model 506 makes a determination that scoped user input 502 (e.g., the natural language input) is associated with a schedule event/meeting intent type. As such, scoped user input 502 is further processed by schedule intent specific machine learning models 508.

Schedule intent specific machine learning models 508 include meeting type intent parameter model 510, date/time intent parameter model 512, and duration intent parameter model 514. Meeting type intent parameter model 510 may comprise a neural network that has been trained to classify and/or identify words or phrases in a natural language input that are associated with a meeting type (e.g., lunch meeting, in person meeting, remote meeting). In examples, meeting types may have default and/or implied date, time, duration, and location values (among other value types) associated with them by the automated task framework 118. The default and/or implied values may be dictated by user preferences or settings, developer choice, and/or data indicating that users associate certain value types (e.g., 12 pm and one hour) with certain meeting types (e.g., lunch type meeting). Date/time intent parameter model 512 may comprise a neural network that has been trained to classify and/or identify words or phrases in a natural language input that are associated with a date and/or time for a meeting. Duration intent parameter model 514 may comprise a neural network that has been trained to classify and/or identify words or phrases in a natural language input that are associated with a duration for a meeting.

In this example, meeting type intent parameter model 510 makes a determination (an incorrect determination) that scoped user input 502 does not include a meeting type intent parameter. As such, the automated task framework 118 utilizes a default meeting type as an execution parameter for that intent parameter. Default execution parameters may be automatically utilized in executing an automated action when a machine learning model does not determine an explicit intent parameter from a natural language input. A default meeting parameter may be determined from user settings or settings associated with a digital assistant or the automated task framework 118 that have been set by developers or administrators. An example of a default meeting parameter may be setting the meeting as a remote (e.g., Teams, Skype) meeting rather than an in-person meeting. Date/time intent parameter model 512 makes a determination that scoped user input 502 includes date intent parameter "next week" but no time intent parameter. Duration intent parameter model 514 makes a determination that scoped user input 502 does not include a duration intent parameter. As such, the automated task framework utilizes a default duration type as an execution parameter for that intent parameter. In this example, the default meeting time (e.g., as determine from user preferences or settings, as determined for meetings of the default type) is 30 minutes.

Based on the processing performed by machine learning models 504 the digital assistant generates digital assistant response 516, which states "I have scheduled a 30 minute meeting for you and user B for next Tuesday at 10 am." Digital assistant response 516 may be provided back to the user account that input the natural language input via an electronic message (e.g., email, SMS message, pop-up window in a software application or operating system shell) or an audio output. The digital assistant response 516 comprises an executed action with a plurality of execution parameters. Each of the plurality of execution parameters corresponds to one of the plurality of intent parameters of the natural language input. For example, digital assistant response 516 includes a first execution parameter ("30 minute"), which corresponds to the default duration intent parameter determined by duration intent parameter model 514, a second execution parameter ("next Tuesday") which corresponds to the date intent parameter determined by date/time intent parameter model 512, and third execution parameter ("10 am"), which may correspond to either a default time intent parameter or to a time that was intelligently identified via analysis of electronic calendars of user accounts as being available for the user accounts that will attend the meeting.

In this example, the user (e.g., user 101) provides user response 518 to the digital assistant. User response 518 states "That's wrong, reschedule to 12 pm for an hour". User response 518 may be included in an electronic message, software application element, voice input to a computing device, and/or operating system shell element. User response 518 is processed with relevant content filtering engine 156, which may comprise a neural model comprising an intra-sentence aggregator, an inter-sentence aggregator, and a classifier. Relevant content filtering engine 156 may have been trained to identify content in a natural language input that is relevant to a user's sentiment. User sentiment engine 152 then processes one or more sentences and/or text strings that relevant content filtering engine 156 determined are relevant to the user's sentiment.

The automated task framework 118, user sentiment engine 152, and/or the digital assistant determines from user response 518 that one or more of machine learning models 504 resulted in an incorrect action/response being executed/generated. As such, digital assistant response 520 is generated and surfaced (e.g., displayed, audibly produced) to the user account. Digital assistant response 520 states: "Did you intend to have a lunch meeting?"

The user provides user response 522 back to the digital assistant, which states "Yes, it was meant to be a lunch meeting." The digital assistant service, user sentiment engine 152, and/or the automated task framework 118 may process user response 522 with one or more machine learning models that have been trained to identify and/or classify words or phrases corresponding to intent parameters or execution parameters that were incorrectly identified or determined by a task execution machine learning model. In this example, a determination is made from processing of user response 522 that the meeting type intent parameter model 510 incorrectly determined a default meeting type intent parameter. However, no other negative feedback is identified in user response 522, as such a determination is made that the date/time intent parameter model 512 and the duration intent parameter model 514 made correct determinations. As such, training feedback 524 is provided back to machine learning models 504 for training those models. Specifically, intent detection model 506 is rewarded and trained with positive reinforcement, meeting type intent parameter model 510 is penalized and trained with negative reinforcement, date/time intent parameter model is rewarded and trained with positive reinforcement, and duration intent parameter model 514 is rewarded and trained with positive reinforcement.

Figure 6:
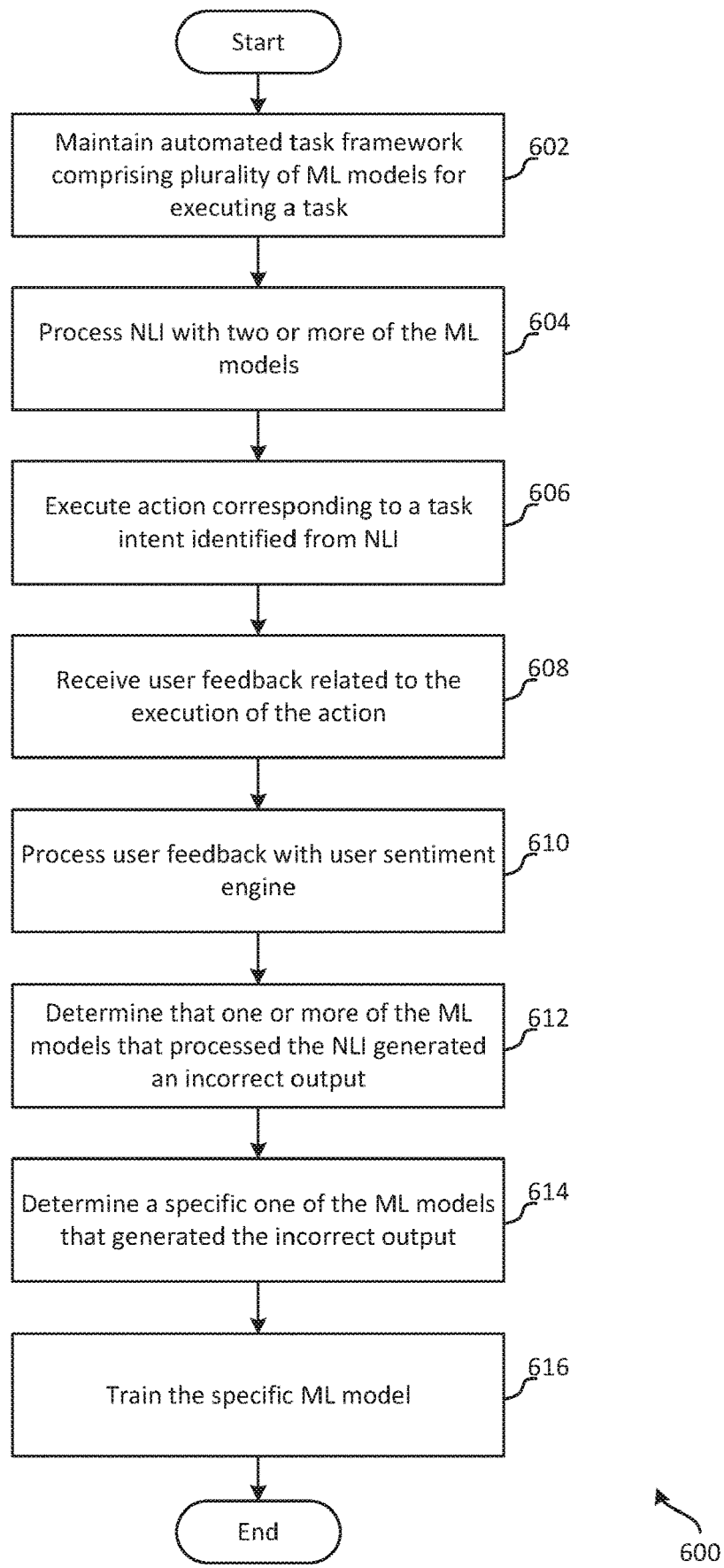
FIG. 6 illustrates an exemplary method for training a machine learning model associated with an automated task framework.

FIG. 6 illustrates an exemplary method 600 for training a machine learning model associated with an automated task framework 118. The method 600 begins at a start operation and flow moves to operation 602.

At operation 602 an automated task framework 118 comprising a plurality of machine learning models for executing a task are maintained. The automated task framework 118 may be associated with a digital assistant service or one or more other AI entities, such as chat bots (e.g., customer service bots, service booking bots), software applications, and task services. The automated task framework 118 may be associated with the processing of one or more task types (e.g., an electronic calendar management task type, a service booking task type, a software application assistant task type).

From operation 602 flow continues to operation 604 where a first natural language input is processed with two or more of the machine learning models. The first natural language input comprises a user input provided to the automated task framework 118. The natural language input may be received by a user device (e.g., voice input device 106, computing device 102) and sent to the automated task framework 118 via one or more application programming interfaces (APIs). In some examples, the first natural language input may be sent to the automated task framework 118 based on a name or alias of an entity (e.g., digital assistant, chat bot) associated with the automated task framework 118 being included in the natural language input. In other examples, the first natural language input may be sent to the automated task framework 118 based on the name of an entity or alias associated with the automated task framework 118 being included in a "to" or "cc" field of an email or electronic message. In additional examples, the first natural language input may be sent to the automated task framework 118 based on the natural language input being input into a computing surface (e.g., a website associated with the entity, a software application associated with the entity, an operating system shell surface associated with the entity) related to an entity associated with the automated task framework 118.

The natural language input may comprise a plurality of intent parameters. Each of the plurality of intent parameters may be processed with a different one of the plurality of machine learning models based on a determined intent parameter type. An intent parameter may comprise one or more words or phrases that are variable for executing an action by the automated task framework 118. For example, for a "schedule meeting" task type, intent parameters may include a type of meeting, a date of meeting, a time of meeting, and/or a duration of meeting. In some examples, a natural language input may not explicitly include all intent parameters needed for the automated task framework 118 to execute an action. In such examples, the automated task framework 118 may revert to default parameters for those non-explicitly included intent parameters. The default parameters may be included in user preferences or settings associated with user accounts. In other examples, default parameters may be set by administrators or developers associated with a digital assistant service or the automated task framework 118.

From operation 604 flow continues to operation 606 where an action corresponding to a task intent identified from the first natural language input is executed. The executed action may comprise a plurality of execution parameters and each of the plurality of execution parameters may correspond to one of a plurality of intent parameters of the natural language input. As an example, if a first intent parameter corresponds to a "remote meeting", and a second intent parameter corresponds to "Tuesday next week", an executed action may include automatically scheduling a meeting by a digital assistant, where a first execution parameter is scheduling a Teams or Skype meeting (e.g., corresponding to the first intent parameter "remote meeting"), and a second execution parameter is scheduling the meeting for next week Tuesday (e.g., corresponding to the second intent parameter "Tuesday next week").

From operation 606 flow continues to operation 608 where user feedback related to the execution of the action is received. The user feedback may comprise explicit feedback, such as spoken input or textual input. In other examples, the user feedback may comprise implicit feedback, such as facial expressions or vocal feedback (e.g., grunts, groans, hums, sighs) that is not in the form of traditional language. In additional examples, the user feedback may comprise asking the automated task framework 118 or a digital assistant associated with the automated task framework 118 to re-execute an executed action within a threshold duration of time from the action's original execution, while providing one or more different intent parameters in that request. The request for re-execution indicates that the user is unhappy with (e.g., has a negative sentiment for) the original action that was executed.

From operation 608 flow continues to operation 610 where the user feedback is processed with a user sentiment engine (e.g., user sentiment engine 152). The user feedback may be processed with one or more of a tokenizer engine 154, a relevant content filtering engine 156, a sentiment machine learning model 157, a prosodic analysis engine 158, and/or facial image machine learning models 160. The user sentiment engine 152 may classify the user feedback into one or more sentiment categories (e.g., positive sentiment, neutral sentiment, negative sentiment). In other examples, the user sentiment engine 152 may score user sentiment on an analog scale rather than into specific categories, where a positive score corresponds to a positive user sentiment (the higher the value the more positive the sentiment), a negative score corresponds to a negative user sentiment (the more negative the value the more negative the sentiment), and a zero score (or a threshold value from a zero score) corresponds to a neutral user sentiment.

From operation 610 flow continues to operation 612 where a determination is made from the processing of the user feedback that one or more of the machine learning models that processed the first natural language input generated an incorrect output. The determination may be made based on determining a negative sentiment from the user feedback by user sentiment engine 152.

From operation 612 flow continues to operation 614 where a determination is made as to a specific one of the machine learning models that generated the incorrect output. For example, if a determination is made from processing of the user feedback with the user sentiment engine 152, that the user has a negative sentiment as to a specific execution parameter that was determined by a specific machine learning model, and the user sentiment engine 152 determines neutral or positive sentiment as to each other execution parameter, there would be no ambiguity as to which machine learning model generated the incorrect output. However, if there is an ambiguity as to which machine learning model generated the incorrect output, the automated task framework 118 may require additional feedback from the user to determine which machine learning models(s) were responsible for the incorrect output.

Thus, in some examples, determining that the specific one of the machine learning models that generated the incorrect output may comprise processing additional user feedback indicating that at least one execution parameter of the executed action was incorrect. If there is an ambiguity as to which machine learning model generated an incorrect output, the automated task framework 118 may send a follow-up message to a user device associated with the user account that provided the natural language input. In some examples, the follow-up message may comprise a query to the user as to which portion (e.g., execution parameter) of the executed action was incorrect. Any received response may be processed by a natural language processing model for determining which machine learning model(s) generated an incorrect output. Thus, the follow-up message may query the user as to which machine learning model produced the incorrect output. In some examples, the follow-up message may include one or more intent parameters and/or execution parameters that the user may select or indicate were incorrectly processed or generated by the automated task framework 118. The automated task framework 118 may then determine from the one or more intent parameters and/or execution parameters that the user selected or indicated were incorrectly processed or generated, which corresponding one or more machine learning models generated an incorrect output. In some examples, the intent and/or execution parameters included in the follow-up message may be included in a software application surface and the intent and/or execution parameters may comprise links that are selectable for sending feedback directly to the automated task framework 118. In additional examples, a user may respond to the automated task framework 118 or a corresponding digital assistant via text or verbal input indicating which intent parameters were incorrectly processed or which execution parameters were incorrectly generated and/or included in an executed action or response.

From operation 614 flow continues to operation 616 where the specific one of the machine learning models is trained based on the determination that the specific one of the machine learning models generated the incorrect output. The specific one of the machine learning models that generated the incorrect output may be penalized by modifying weights of one or more nodes in a neural network corresponding the specific machine learning model via back propagation. In additional examples, one or more machine learning models for which a neutral and/or positive sentiment was identified may be trained with positive reinforcement via back propagation.

From operation 614 flow moves to an end operation and the method 600 ends.

Figure 7:
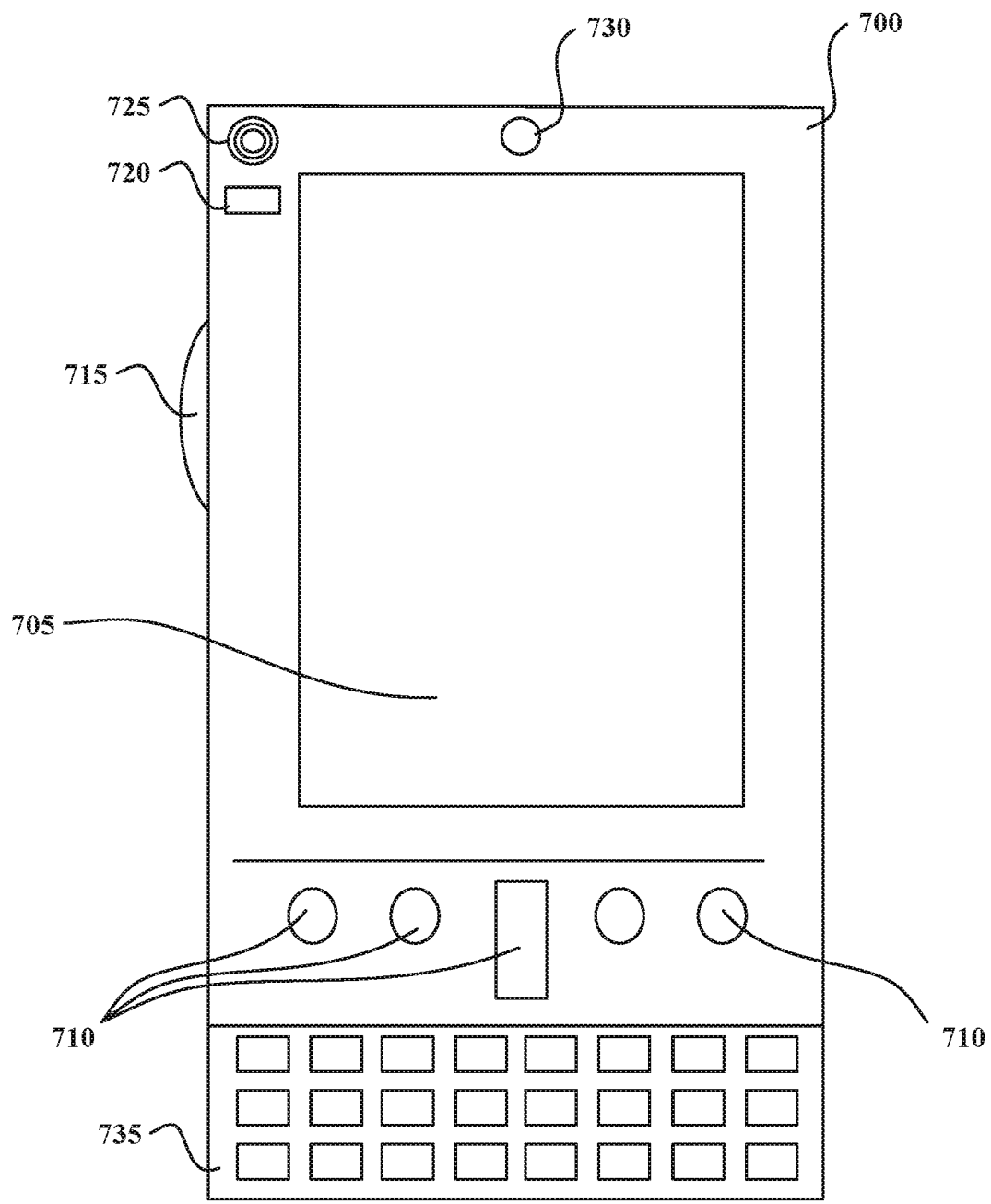
FIGS. 7 and 8 are simplified diagrams of a mobile computing device with which aspects of the disclosure may be practiced.
Figure 8:
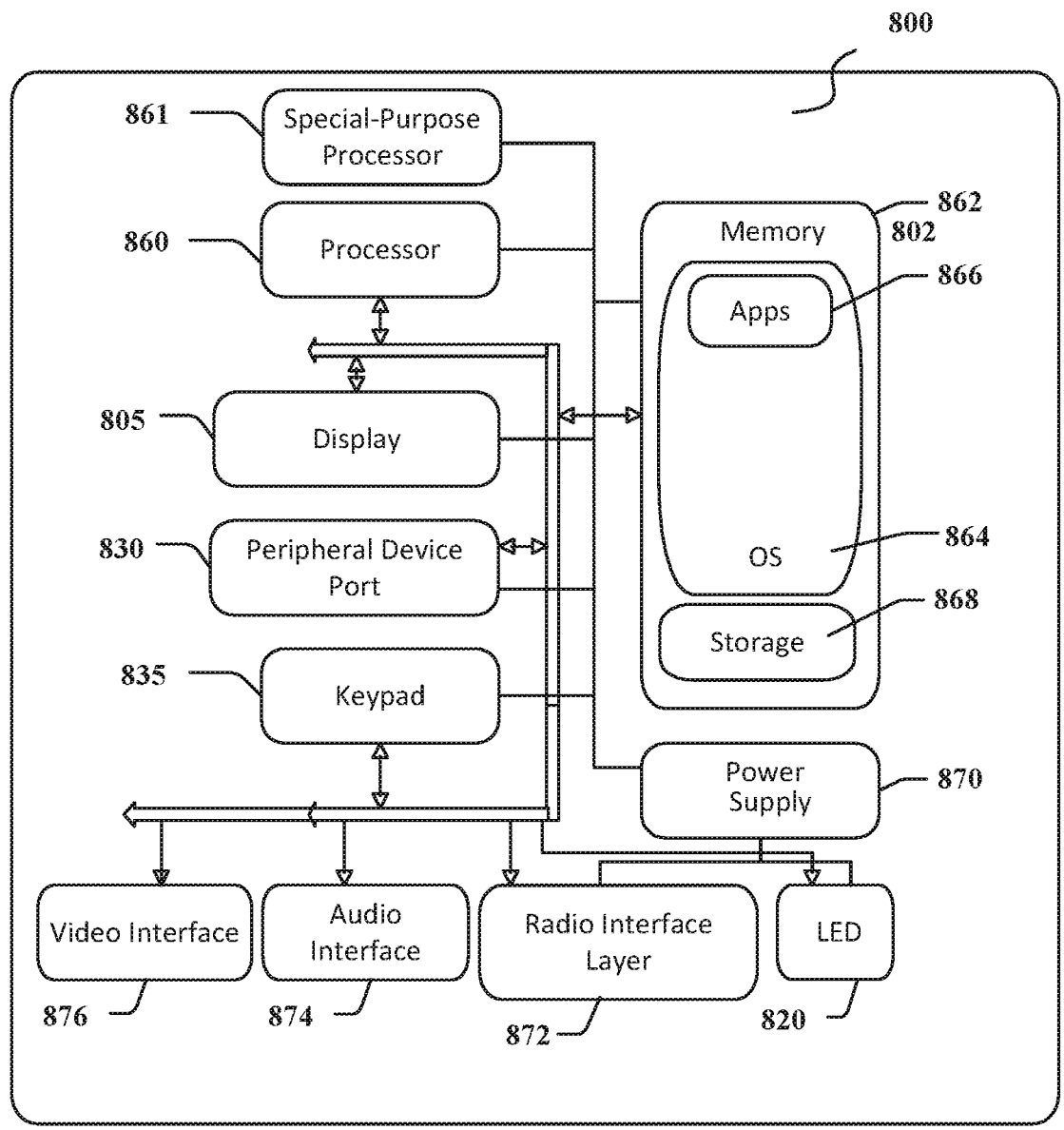

FIGS. 7 and 8 illustrate a mobile computing device 700, for example, a mobile telephone, a smart phone, wearable computer, a tablet computer, an e-reader, a laptop computer, and an augmented reality computer, with which embodiments of the disclosure may be practiced. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705, 805 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or fewer input elements. For example, the display 705 may not be a touch screen in some embodiments. In yet another alternative embodiment, the mobile computing device 700 is a portable phone system, such as a cellular phone. The mobile computing device 700 may also include an optional keypad 735, 835. Optional keypad 735 may be a physical keypad or a "soft" keypad generated on the touch screen display. In various embodiments, the output elements include the display 705 for showing a graphical user interface (GUI), a visual indicator 620 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports (e.g., peripheral device port 830), such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including instructions for identifying a target value in a data set.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 720 may be used to provide visual notifications, and/or an audio interface 874 may be used for producing audible notifications via the audio transducer 725. In the illustrated embodiment, the visual indicator 720 is a light emitting diode (LED) and the audio transducer 725 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 730 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
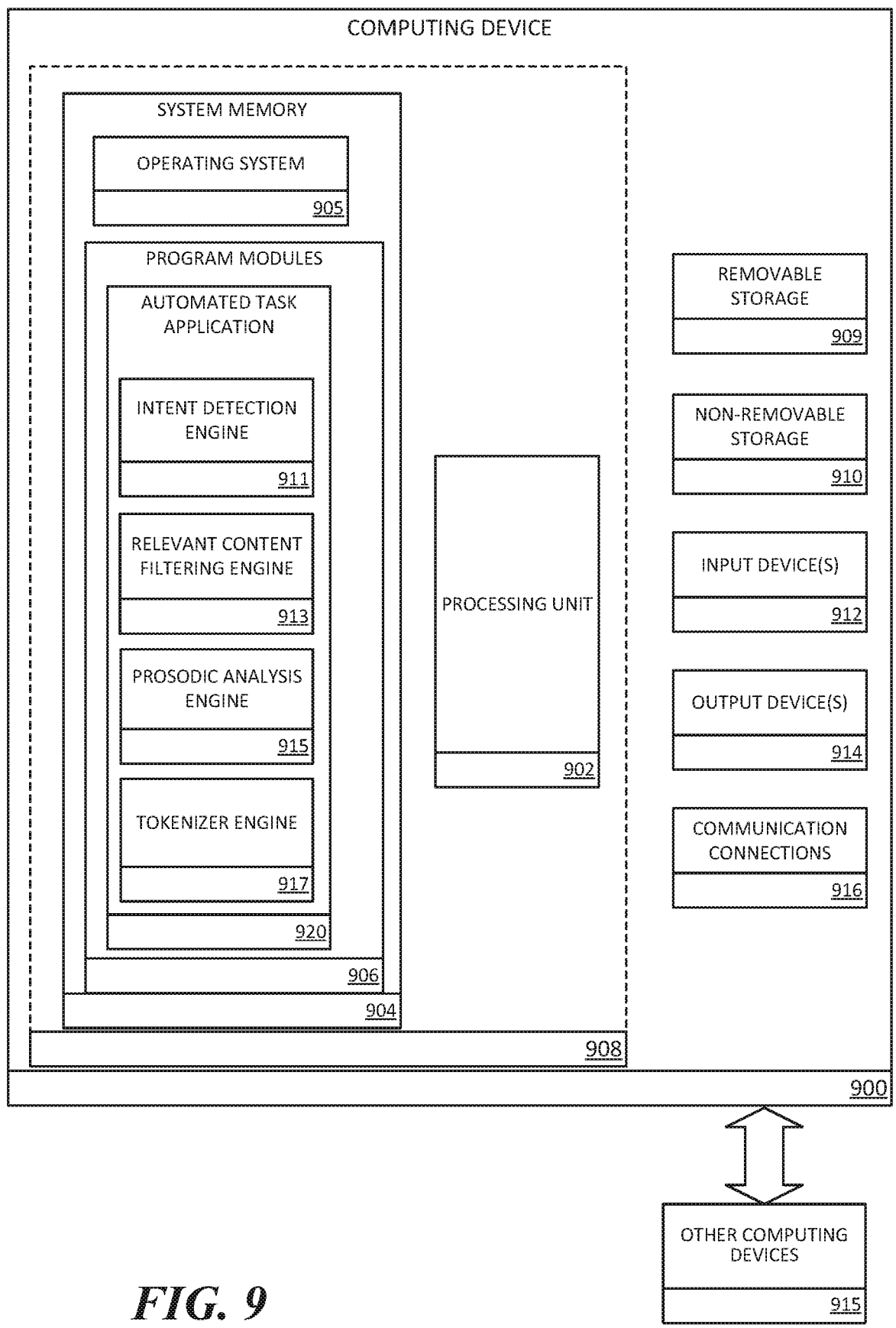
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may have computer executable instructions for training machine learning models associated with an automated task framework. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 suitable for running one or more productivity application programs. The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., automated task application 920) may perform processes including, but not limited to, the aspects, as described herein. According to examples, intent detection engine 911 may perform one or more operations associated with processing natural language inputs with one or more machine learning models and identifying one or more intent types. Relevant content filtering engine 913 may perform one or more operations associated with identifying, from a natural language input, content that is related to a task intent or content that is related to user sentiment. Prosodic analysis engine 915 may perform one or more operations associated with classifying prosodic features of a user voice input as relating to user sentiment. Tokenizer engine 917 may perform one or more operations associated with tagging and/or partitioning portions of a received natural language input as sentences for more efficient processing.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 915. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include transitory media (e.g., a carrier wave or other propagated or modulated data signal). Computer storage device does not include transitory media (e.g., a carrier wave or other propagated or modulated data signal). Computer-readable storage device does not include transitory media (e.g., a carrier wave or other propagated or modulated data signal).

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10:
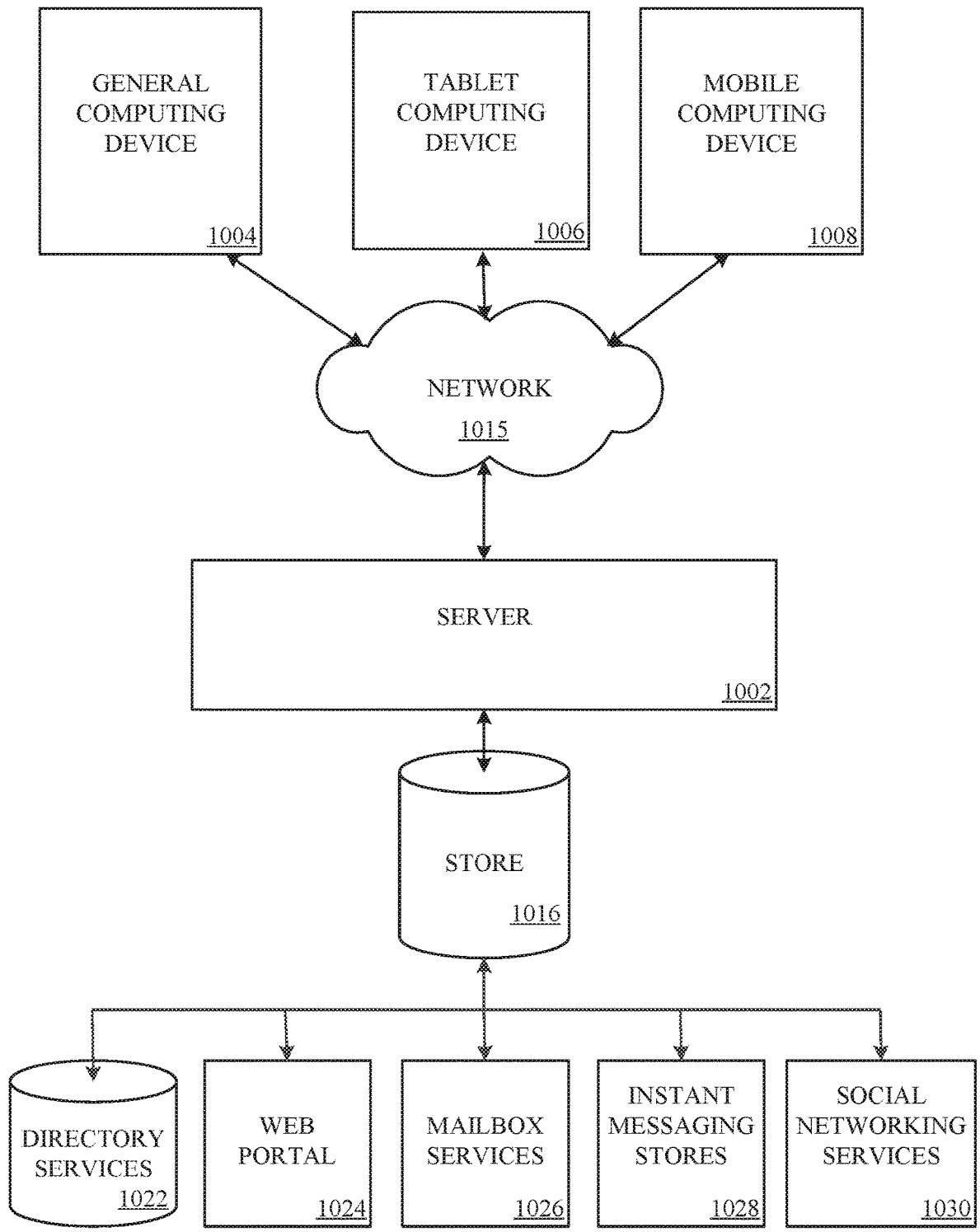
FIG. 10 is a simplified block diagram of a distributed computing system in which aspects of the present disclosure may be practiced.

FIG. 10 illustrates one aspect of the architecture of a system for processing data received at a computing system from a remote source, such as a personal/general computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. The program modules 1006 may be employed by a client that communicates with server device 1002, and/or the program modules 1006 may be employed by server device 1002. The server device 1002 may provide data to and from a client computing device such as a personal/general computer 1004, a tablet computing device 1006 and/or a mobile computing device 1008 (e.g., a smart phone) through a network 1015. By way of example, the computer system described above with respect to FIGS. 7-9 may be embodied in a personal/general computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method comprising:
maintaining an automated task framework comprising a plurality of machine learning models for executing a task;
processing a natural language input to determine a task intent of the natural language input;
selecting two or more machine learning models of the plurality of machine learning models based on the task intent, wherein each of the two or more of the machine learning models are trained to output execution parameter values for use in executing an action corresponding to the task intent;
identifying a first execution parameter value associated with the action using a first machine learning model of the two or more machine learning models based on applying the first machine learning model to the natural language input;
identifying a second execution parameter value associated with the action using a second machine learning model of the two or more machine learning models based on applying the second machine learning model to the natural language input;
executing the action corresponding to the task intent, wherein the executing comprises using the first execution parameter value for a first execution parameter of the action and the second execution parameter value for a second execution parameter of the action, and wherein the first execution parameter and the second execution parameter are distinct execution parameters of the action;
receiving user feedback related to the execution of the action;
processing the user feedback with a user sentiment engine;
determining, from the processing of the user feedback, that one or more of the two or more machine learning models that processed the natural language input identified an incorrect execution parameter value;
determining a specific one of the machine learning models that identified the incorrect execution parameter value based at least in part on the user feedback, the first execution parameter value, and the second execution parameter value; and
performing additional training of the specific one of the machine learning models based on the determination that the specific one of the machine learning models identified the incorrect execution parameter value.

2. The computer-implemented method of claim 1, wherein:
the natural language input comprises a plurality of intent parameters; and
each of the plurality of intent parameters is processed with a different one of the plurality of machine learning models based on a determined intent parameter type.

3. The computer-implemented method of claim 1, wherein:
the determining the specific one of the machine learning models that identified the incorrect execution parameter value comprises processing additional user feedback indicating that at least one execution parameter value of the executed action was incorrect.

4. The computer-implemented method of claim 2, wherein determining the specific one of the machine learning models that identified the incorrect execution parameter value comprises:
processing a second natural language input comprising at least one intent parameter that is different from the natural language input received within a threshold duration of time from the execution of the action; and
determining that the second natural language input is associated with the task intent and the action.

5. The computer-implemented method of claim 2, wherein:
the specific one of the machine learning models that identified the incorrect execution parameter value comprises a neural network; and
performing the additional training of the specific one of the machine learning models comprises modifying weights of one or more nodes in the neural network via back propagation.

6. The computer-implemented method of claim 1, wherein processing the natural language input further comprises:
tokenizing the natural language input into a plurality of sentences;
processing each of the plurality of sentences with a neural model comprising an intra-sentence aggregator, an inter-sentence aggregator, and a classifier; and
identifying, from the processing with neural model, a subset of the plurality of sentences that are relevant to the task intent.

7. The computer-implemented method of claim 6, wherein processing the natural language input further comprises:
determining that an intent parameter included in a first one of the sentences of the subset corresponds to a first intent parameter type;
processing the first one of the sentences of the subset with a machine learning model associated with the first intent parameter type;
determining that a second intent parameter included in a second one of the sentences of the subset corresponds to a second intent parameter type; and
processing the second one of the sentences of the subset with a machine learning model associated with the second intent parameter type.

8. The computer-implemented method of claim 1, wherein the user feedback comprises a second natural language input, and wherein the processing of the user feedback with the user sentiment engine comprises:
processing the second natural language input with a neural model comprising an intra-sentence aggregator, an inter-sentence aggregator, and a classifier; and
identifying, from the processing of the second natural language input with the neural model, at least a portion of the second natural language input that is relevant to a user's sentiment in relation to the executed action.

9. The computer-implemented method of claim 8, wherein the processing of the user feedback with the user sentiment engine further comprises:
generating one or more vector embeddings from the portion of the second natural language input; and
classifying the one or more vector embeddings to a sentiment type.

10. The computer-implemented method of claim 1, wherein:
the additional training of the specific one of the machine learning models comprises providing negative reinforcement to the specific one of the machine learning models; and the computer-implemented method further comprises providing positive reinforcement to one or more other machine learning models that processed the natural language input.

11. The computer-implemented method of claim 1, wherein:
the task intent is an electronic event scheduling task intent;
executing the action comprises scheduling an event on at least one electronic calendar;
the natural language input comprises a plurality of intent parameters associated with the electronic event; and
each of the plurality of intent parameters is processed with a different one of the plurality of machine learning models based on a determined intent parameter type.

12. A system comprising:
a memory for storing executable program code; and
one or more processors, functionally coupled to the memory, the one or more processors being responsive to computer-executable instructions contained in the program code and operative to:
maintain an automated task framework comprising a plurality of machine learning models for executing a task;
process a natural language input to determine a task intent of the natural language input;
select two or more machine learning models of the plurality of machine learning models based on the task intent, wherein each of the two or more of the machine learning models are trained to output execution parameter values for use in executing an action corresponding to the task intent;
identify a first execution parameter value associated with the action using a first machine learning model of the two or more machine learning models based on applying the first machine learning model to the natural language input;
identify a second execution parameter value associated with the action using a second machine learning model of the two or more machine learning models based on applying the second machine learning model to the natural language input;
execute the action corresponding to the task intent, wherein to execute comprises using the first execution parameter value for a first execution parameter of the action and the second execution parameter value for a second execution parameter of the action, and wherein the first execution parameter and the second execution parameter are distinct execution parameters of the action;
receive user feedback related to the execution of the action;
process the user feedback with a user sentiment engine;
determine, from the processing of the user feedback, that one or more of the two or more machine learning models that processed the natural language input identified an incorrect execution parameter value;
determine a specific one of the machine learning models that identified the incorrect execution parameter value based at least in part on the user feedback, the first execution parameter value, and the second execution parameter value; and
perform additional training of the specific one of the machine learning models based on the determination that the specific one of the machine learning models identified the incorrect execution parameter value.

13. The system of claim 12, wherein:
the natural language input comprises a plurality of intent parameters included in an electronic message sent from a first computing device; and
each of the plurality of intent parameters is processed with a different one of the plurality of machine learning models based on a determined intent parameter type.

14. The system of claim 12, wherein:
the determining the specific one of the machine learning models that identified the incorrect execution parameter value comprises processing additional user feedback indicating that at least one execution parameter value of the executed action was incorrect.

15. The system of claim 12, wherein the user feedback comprises a second natural language input, and wherein in processing the user feedback with the user sentiment engine, the one or more processors are further responsive to the computer-executable instructions contained in the program code and operative to:
process the second natural language input with a neural model comprising an intra-sentence aggregator, an inter-sentence aggregator, and a classifier; and
identify, from the processing of the second natural language input with the neural model, at least a portion of the second natural language input that is relevant to a user's sentiment in relation to the execution.

16. The system of claim 15, wherein in processing the user feedback with the user sentiment engine, the one or more processors are further responsive to the computer-executable instructions contained in the program code and operative to:
generate one or more vector embeddings from the portion of the second natural language input; and
classify the one or more vector embeddings to a sentiment type comprising one of: a positive sentiment type, a negative sentiment type, and a neutral sentiment type.

17. The system of claim 12, wherein:
the task intent is an electronic event scheduling task intent;
executing the action comprises scheduling an event on at least one electronic calendar;
the natural language input comprises a plurality of intent parameters associated with the electronic event; and
each of the plurality of intent parameters is processed with a different one of the plurality of machine learning models based on a determined intent parameter type.

18. A computer-readable storage device comprising executable instructions that, when executed by one or more processors, assists with training machine learning models in an automated task framework, the computer-readable storage device including instructions executable by the one or more processors for:
accessing an automated task framework comprising a plurality of machine learning models for executing a task;
processing a natural language input with two or more machine learning models of the plurality of machine learning models to determine a task intent of the natural language input;
selecting two or more of the machine learning models based on the task intent, wherein each of the two or more of the machine learning models are trained to output execution parameter values for use in executing an action corresponding to the task intent;
identifying a first execution parameter value associated with the action using a first machine learning model of the two or more machine learning models based on applying the first machine learning model to the natural language input;

identifying a second execution parameter value associated with the action using a second machine learning model of the two or more machine learning models based on applying the second machine learning model to the natural language input;

executing the action corresponding to the task intent, wherein the executing comprises using the first execution parameter value for a first execution parameter of the action and the second execution parameter value for a second execution parameter of the action, and wherein the first execution parameter and the second execution parameter are distinct execution parameters of the action;

receiving user feedback related to the execution of the action;

processing the user feedback with a user sentiment engine;

determining, from the processing of the user feedback, that one or more of the two or more machine learning models that processed the natural language input identified an incorrect execution parameter value;

determining a specific one of the machine learning models that identified the incorrect execution parameter value based at least in part on the user feedback, the first execution parameter value, and the second execution parameter value; and performing additional training of the specific one of the machine learning models based on the determination that the specific one of the machine learning models identified the incorrect execution parameter value.

19. The computer-readable storage device of claim 18, wherein:

the natural language input comprises a plurality of event parameters included in an electronic message sent from a first computing device; and each of the plurality of event parameters is processed with a different one of the plurality of machine learning models based on a determined event parameter type.

20. The computer-readable storage device of claim 18, wherein:

the determining the specific one of the machine learning models that identified the incorrect execution parameter value comprises processing additional user feedback indicating that at least one execution parameter value of the executed action was incorrect.

* * * * *